(12) United States Patent
Guedalia et al.

(10) Patent No.: US 6,535,878 B1
(45) Date of Patent: Mar. 18, 2003

(54) METHOD AND SYSTEM FOR PROVIDING ON-LINE INTERACTIVITY OVER A SERVER-CLIENT NETWORK

(75) Inventors: Isaac David Guedalia, Bet Shemesh (IL); Jonathan Hashkes, Jerusalem (IL); Jacob Leon Guedalia, Jerusalem (IL)

(73) Assignee: Roxio, Inc., Santa Clara, CA (US)

( * ) Notice: Subject to any disclaimer, the term of this patent is extended or adjusted under 35 U.S.C. 154(b) by 0 days.

(21) Appl. No.: 09/045,068

(22) Filed: Mar. 19, 1998

Related U.S. Application Data

(63) Continuation-in-part of application No. 08/850,690, filed on May 2, 1997, now Pat. No. 5,968,120.

(30) Foreign Application Priority Data

Feb. 26, 1998 (IL) ................................................ 123479

(51) Int. Cl.[7] ........................... G06F 17/30; G06F 15/16
(52) U.S. Cl. ............................. 707/8; 707/10; 707/100; 709/102; 709/108
(58) Field of Search ................ 707/1–204; 709/102–108

(56) References Cited

U.S. PATENT DOCUMENTS

| | | | |
|---|---|---|---|
| 4,876,651 A | 10/1989 | Dawson et al. | |
| 4,897,867 A | 1/1990 | Foster et al. | 379/93.12 |
| 5,030,117 A | 7/1991 | Delorme | |
| 5,119,188 A | 6/1992 | McCalley et al. | 725/93 |
| 5,122,873 A | 6/1992 | Golin | 375/240.23 |
| 5,195,092 A | 3/1993 | Wilson et al. | 725/146 |
| 5,220,420 A | 6/1993 | Hoarty et al. | 725/119 |
| 5,236,199 A | 8/1993 | Thompson, Jr. | 463/41 |
| 5,251,209 A | 10/1993 | Jurkevich et al. | 370/468 |
| 5,265,248 A | 11/1993 | Moulios et al. | 709/100 |
| 5,283,819 A | 2/1994 | Glick et al. | 379/93.01 |

(List continued on next page.)

OTHER PUBLICATIONS

IEEE Computer Society Press, "FouRteenth IEEE Symposium on Mass Storage Systems Storage–At the Forefront of Information Infrastructures", Monterey, CA, Sep. 11–14, 1995, pp 146–161.

Thomas Stephenson, "Networked Large Image Archives: The Storage & Management Issues", Advanced Imaging, vol. 8, No. 1, Jan. 1993 4 pgs.

N.Dal Degan, et al., "Still images retrieval from a remote database: The system *Imagine*", Signal Processing: Image Communication 5 (1993) pp. 219–234.

(List continued on next page.)

*Primary Examiner*—Maria N. Von Buhr
(74) *Attorney, Agent, or Firm*—Blakely, Sokoloff, Taylor & Zafman LLP

(57) ABSTRACT

Apparatus and a method for communicating media over a network including encoding the media into a server database at a server, downloading from the server database to a client database generally only those portions of the media which are necessary to satisfy user requests and in response to a user request for a given item of media, determining whether the media is present in the client database, and if not, automatically downloading those portions of the media which are necessary to supply the user with the given item of media from the server database. An image server is provided including at least one processor operative to supply portions of image data to clients in response to multiple requests therefrom, and thread management software operating the at least one processor by causing it to process the requests using at least one of a plurality of threads, the thread management software being characterized in that it initiates a new thread when an existing thread has exceeded a predetermined metric of busyness.

30 Claims, 9 Drawing Sheets

U.S. PATENT DOCUMENTS

| | | | |
|---|---|---|---|
| 5,325,423 A | 6/1994 | Lewis | 379/93.08 |
| 5,339,415 A | 8/1994 | Strout, II et al. | |
| 5,351,276 A | 9/1994 | Doll, Jr. et al. | 379/88.17 |
| 5,363,482 A | 11/1994 | Victor et al. | 345/804 |
| 5,420,572 A | 5/1995 | Dolin, Jr. et al. | 340/825.22 |
| 5,420,801 A | 5/1995 | Dockter et al. | 345/501 |
| 5,437,032 A | 7/1995 | Wolf et al. | |
| 5,438,658 A | 8/1995 | Fitzpatrick et al. | 345/814 |
| 5,487,167 A | 1/1996 | Dinallo et al. | 707/500.1 |
| 5,495,576 A | 2/1996 | Ritchey | 345/420 |
| 5,508,940 A | 4/1996 | Rossmere et al. | 345/723 |
| 5,519,435 A | 5/1996 | Anderson | 725/92 |
| 5,553,221 A | 9/1996 | Reimer et al. | 345/720 |
| 5,553,222 A | 9/1996 | Milne et al. | 707/500.1 |
| 5,557,538 A | 9/1996 | Retter et al. | 375/240.15 |
| 5,561,791 A | 10/1996 | Mendelson et al. | 709/223 |
| 5,564,001 A | 10/1996 | Lewis | 707/500.1 |
| 5,577,180 A | 11/1996 | Reed | 345/634 |
| 5,577,258 A | 11/1996 | Cruz et al. | 709/219 |
| 5,581,783 A | 12/1996 | Ohashi | 710/5 |
| 5,682,441 A | 10/1997 | Ligtenberg et al. | 382/232 |
| 5,692,192 A | 11/1997 | Sudo | 709/105 |
| 5,710,835 A | 1/1998 | Bradley | |
| 5,737,599 A | 4/1998 | Rowe et al. | |
| 5,752,031 A | 5/1998 | Cutler et aL. | 709/103 |
| 5,760,783 A | 6/1998 | Migdal et al. | 345/430 |
| 5,764,235 A | 6/1998 | Hunt et al. | |
| 5,974,438 A * | 10/1999 | Neufield | 709/104 |
| 5,991,792 A * | 11/1999 | Nageswaran | 709/102 |
| 6,006,235 A * | 12/1999 | Macdonald et al. | 707/103 |
| 6,020,884 A * | 2/2000 | MacNaughton et al. | 345/329 |
| 6,061,710 A * | 5/2000 | Eickenmeyler | 709/107 |
| 6,081,906 A * | 6/2000 | Nishizawas | 714/2 |
| 6,108,715 A * | 8/2000 | Leach et al. | 709/330 |
| 6,175,879 B1 * | 1/2001 | Shah et al. | 709/330 |
| 6,212,573 B1 * | 4/2001 | Lim et al. | 709/315 |

OTHER PUBLICATIONS

Lance Williams, "Pyramidal Parametrics", Computer Graphics Laboratory, vol. 17, No. 3, Jul. 1983, 11 pgs.

Helen C. Marz, et al, "Cameras, Scanners, and Image Acquisition Systems", Society of Photo–Optical Instrumentation Engineers, vol. 1901, Feb. 3–4, 1993, pp. 25–36.

PCT International Search Report, mailed Feb. 25, 1999 in connection with International Application No. PCT/IL98/00174 (5 pages).

John R. Smith, et al., "Quad–Tree Segmentation for Texture–Based Image Query", Center for Telecommunications Research and Electrical Engineering Department, 12 pgs.

Shiu–Fu Chang, et al., "Development of Advanced Image/Video Servers in a Video on Demand Testbed", Department of Electrical Engineering & Center for Telecommunications Research, 6pgs.

"FlashPix Format Specification", 1996, 1997, Eastman Kodak Company.

"Internet Imaging Protocol", 1997, Hewlett Packard Company, Live Picture, Inc., and Eastman Kodak Company.

Hethmon, Paul S., "Illustrated guide to HTTP", Manning Publications Co., Greenwich, CT, 1997.

Jeffry Dwight, Michael Erwin, and Robert Niles, "Using CGI", Second Edition, Que Corporation, Indianapolis, IN, 1997.

http://www.w3.org/protocols, Mar. 19, 1998.

http://204.57.196.12:80/reference/htmlspec2.0, Mar. 19, 1998.

http://www.pricecostco.com/exchange/irf/cgi–spec.html., Mar. 19, 1998.

* cited by examiner

METHOD AND SYSTEM FOR PROVIDING ON-LINE INTERACTIVITY OVER A SERVER-CLIENT NETWORK

This application is a Continuation-in-Part of U.S. patent application Ser. No. 08/850,690 filed May 2, 1997 now issued as U.S. Pat. No. 5,968,120.

COMPUTER PROGRAM LISTING APPENDIX

This application contains an appendix consisting of a computer program listing of more than 300 lines. The computer listing is provided on a single CD-R and is accompanied by a duplicate copy (two CD-R in total). The material contained on the CD-R is hereby incorporated herein by reference and consists of one file, titled "Appendix A," created on Jul. 15, 2002, and comprising 318,238 bytes.

FIELD OF THE INVENTION

The present invention relate to server-client networks generally, and more specifically to server thread management which enables on-line access of interactive media over the Internet.

BACKGROUND OF THE INVENTION

Sharing of information has long been a goal of modern civilization. Information must be represented in some form in order that it can be transferred between people. Humans are gifted with five sensory modes of perception. Visual perception has been given the lion's share of the brain. It is noted by Dr. Judith Guedalia, of the Neuro-Psychological Department of Shaare Zedek Medical Center in Jerusaleum, Israel, that although the famous Helen Keller, who was both deaf and blind, was quoted as saying that she would prefer hearing over sight if she had to choose, this may have been based on psychological reasons, since group activity is better enabled with hearing.

Visual stimulation is perhaps the most efficient means for people to acquire information. The cliché "a picture is worth a thousand words" is well-founded. The ratio of brains cells devoted to sight versus those devoted to sound is roughly 100:1. From the days of cave carving to the printing press, visual information has been the primary medium for communication.

Recently information has taken on a digital form, which has enabled electronic transmission of information. The most notable example is the dissemination of information through the World Wide Web (referred to simply as the "Web"), which is a collection of millions of computers interconnected by electronic communication devices.

Various techniques are known for providing on-line access of interactive media over the Web.

The following U.S. Patents have been found in a U.S. Patent Search and are believed to be generally relevant to the field of the invention:

U.S. Pat. No. 4,897,867 January 1990 Foster et al.
U.S. Pat. No. 5,119,188 June 1992 McCalley et al.
U.S. Pat. No. 5,122,873 June 1992 Golin
U.S. Pat. No. 5,195,092 March 1993 Wilson et al.
U.S. Pat. No. 5,220,420 June 1993 Hoarty et al.
U.S. Pat. No. 5,236,199 August 1993 Thompson, Jr.
U.S. Pat. No. 5,251,209 October 1993 Jurkevich et al.
U.S. Pat. No. 5,265,248 November 1993 Moulios et al.
U.S. Pat. No. 5,283,819 January 1994 Glick et al.
U.S. Pat. No. 5,325,423 June 1994 Lewis
U.S. Pat. No. 5,351,276 September 1994 Doll, Jr. et al.
U.S. Pat. No. 5,363,482 November 1994 Victor et al.
U.S. Pat. No. 5,420,572 May 1995 Dolin, Jr. et al.
U.S. Pat. No. 5,420,801 May 1995 Dockter et al.
U.S. Pat. No. 5,438,658 August 1995 Fitzpatrick et al.
U.S. Pat. No. 5,487,167 January 1996 Dinallo et al.
U.S. Pat. No. 5,495,576 February 1996 Ritchey
U.S. Pat. No. 5,508,940 April 1996 Rossmere et al.
U.S. Pat. No. 5,519,435 May 1996 Anderson
U.S. Pat. No. 5,553,221 September 1996 Reimer et al.
U.S. Pat. No. 5,553,222 September 1996 Milne et al.
U.S. Pat. No. 5,557,538 September 1996 Retter et al.
U.S. Pat. No. 5,561,791 October 1996 Mendelson et al.
U.S. Pat. No. 5,564,001 October 1996 Lewis
U.S. Pat. No. 5,577,180 November 1996 Reed
U.S. Pat. No. 5,577,258 November 1996 Cruz et al.
U.S. Pat. No. 5,581,783 December 1996 Ohashi Transportation of digital signals between computers is plagued by a bandwidth problem, where a limited bandwidth creates bottlenecks in the transmission of electronic signals. Fortunately, textual information can be represented efficiently electronically, and this has enabled the Web publishing industry to flourish. Unfortunately, however, image information is difficult to represent compactly in electronic form.

A server or host computer (hereinafter referred to as a "server") is used for placing information where it is available for access by multiple users. The Web has enabled convenient publishing of information from a server to client computers (hereinafter referred to as "clients") that are controlled by users requesting information.

When using various media such as video, audio, text and images, a user generally retrieves the media from a server connected via a network to many clients. The server downloads the media to the network and transmits it to the client computer at the user's request.

There are two basic limitations involved in such data retrieval: delay between the time that a user requests the data and the time when the server downloads it to the network, and bandwidth limitations on data throughput and rate of data transmission.

One example of such a server-client network is a network connecting Web servers and users' personal computers. Such networks are installed in order to facilitate convenient data transmission between users, and data distribution from the server to the users' computers.

Known network applications involve streaming data from a server to a client computer. "Streaming" refers to serial or parallel transmission of digital data between two computers, by transmitting sequences of bit packets. For example, installation executables on a network server stream files to a client computer performing the installation. Servers with large amounts of memory are used to archive digital movies, which are streamed to a client computer for viewing upon demand. Digital video is broadcast from cable stations to subscribers using streaming. Web browsers, such as Netscape and Microsoft Explorer, are used to stream data from a server on the Web to a client.

Web sites can contain enormous databases, such as phone directories for all of the cities in the U.S., photographs from art galleries and museums around the world, voluminous encyclopedias, and even copies of all patents ever issued by the U.S. Patent & Trademark Office. Users of the Web can search these databases and then request the server to download specific information. This request initiates a streaming event.

Accessing information over the Web is typically done using Web browsers. A Web browser is software that resides on a client computer and communicates with servers via established protocols. Information transmitted by servers is converted to visual displays on the client computer by means of a Web browser.

Internet protocols enable client-server communication over the Web. These protocols include low level protocols, such as Transaction Control Protocol/Internet Protocol (TCP/IP), and higher level protocols such as Hypertext Transfer Protocol (HTTP) A general reference on Internet protocols may be accessed on:

http://www.w3.org/Protocols, or http://www.cis.ohio-state.edu/tbin/rfc/arpa-internet-protocols.html.

Another useful reference is: Hethmon, Paul S., *Illustrated Guide to HTTP,* Manning Publications Co., Greenwich, Conn., 1997.

HTTP servers provide a way for remote clients to access data on servers. HTTP provides a method for making simple requests from a client to a server. Client requests can take the form of GET requests or POST requests in HTTP 1.0. Typically, in a GET or POST request the client specifies a file to be delivered, and through HTTP headers the server can specify what is being delivered. The most pervasive file format used on the Web is HyperText Markup Language (HTML). A reference on HTML may be accessed at:

http://204.57.196.12/reference/htmlspec2.0.

HTML files are typically relatively small, i.e. less than 100 Kbytes.

HTTP/1.0 specifies that a communication between a server and client proceeds as follows: A client's request is initiated with a header which is terminated by a double carriage return linefeed. This is followed by the body of the request which is similarly terminated by a double carriage return linefeed. The server responds with an HTTP header terminated with a carriage return linefeed and then sends the body of the response. The response is terminated when a socket is closed. This normally occurs when the server has finished returning data to the client, and the server closes the socket.

Server performance is generally inversely proportional to the quantity of data being served per unit time. The task of delivering a file from a server to a client is typically not computationally expensive. This task includes reading the file from the server's peripherals, e.g. a disk drive, and transmitting the data from the file in the specified protocol, e.g. TCP/IP. TCP/IP transmits data in units of "packets." The time it takes for a client to retrieve a file depends upon the number of packets transmitted by the server.

One problem shared by virtually all server applications is the need to process many client requests simultaneously. Efficient methods of processing multiple client requests utilize the server's resources fully. Many computers, even though they are limited by having only a single Central Processing Unit (CPU), can perform specific multiple independent tasks simultaneously, such as reading data from the disk and transmitting data over a network connection. This is enabled by buffers designed to speed up the dialogue with the peripherals, such as network cards, disks and video display cards.

Modern operating systems support multi-tasking, which is the ability to run many separate applications at the same time. A single software program can take advantage of multi-tasking by creating multiple concurrent "threads." Each thread simulates a separate application. Thus an HTTP server, for example, can use multiple threads to optimize its performance in responding to concurrent requests. Each request can be processed in a separate thread, and while one request is being processed in the CPU, a second request can be transmitted through the network hardware. If only one thread is used, then although the network hardware is buffered, the processing of the second request can become blocked—because the single thread waits for the network to finish sending.

Another advantage of using multiple threads to handle multiple requests is fairness. For example, suppose two clients simultaneously request information, one requests a large quantity of data while another requests a small amount. If their requests were to be handled within a single thread, the second client would have to wait until the completion of the first request. Multiple threads enable both clients to receive data concurrently.

The use of multiple threads in server applications works best when each request is independent of the other, in the sense that, for the most part, they do not share the same host computer resources. However, some sharing is inevitable. When threads share resources, this may produce bottlenecks in the transmission of data, CPU usage and access to peripherals. For example, using multiple threads creates problems such as page faults. Page faults occur when a thread requests a page of memory which is not readily available to the operating system. Thus server applications try to limit the number of concurrent threads, while optimizing performance and fairness.

One popular method for limiting the number of concurrent threads, implemented in the servers of two leading commercial server vendors—Microsoft Internet Information Services (IIS) and Netscape Enterprise, is as follows: A maximum number of threads is pre-set. Multiple threads are created as requests are received. In these servers, thread initiation is determined by client requests. These threads form a thread pool. The threads can be in either of two states—a wait state, in which they are idle and wait for a request to process, or a busy state, in which they are processing a request. At a time that the maximum limit of allowable concurrent requests/threads is reached and they are all busy, subsequent requests are queued pending availability of a free thread.

Added functionality for server-side applications may be provided via a secondary protocol, such as Common Gateway Interface (CGI). A reference on CGI may be accessed at:

http://www.pricecostco.com/exchange/irf/cgi-spec.html.

Reference is also made to Dwight, J., Erwin, Michael and Niles, Robert, *Using CGI, Second Edition,* Que Corporation, Indianapolis, Ind., 1997.

Unlike file retrieval governed by HTML, added functionality may involve intensive processing. The introduction of many server-side applications introduces severe performance problems. As mentioned above, multiple threads work best when each request is independent of each other. Otherwise, if two requests use a common resource, e.g., the same database, a situation may occur in which one request needs to wait until processing of the other request is complete and the resource is freed up. Currently webmasters, who are administrators of servers on the Web, manually tune a number of parameters to increase performance of their Web servers. A description of fine-tuning thread administration may be accessed at:

http://www.asia.microsoft.com/isn/techcenter/tuningIIS.htm.

In the above-referenced description there appears a discussion of how to tune two parameters, ProcessorThreadMax and RequestQueueMax. ProcessorThreadMax sets a maximum limit on the number of concurrent threads per processor, and RequestQueueMax sets a maximum limit on the size of the request queue. Reference is also made to *Microsoft Windows NT Server Resource Kit Version 4.0, Supplement One,* Microsoft Press, Redmond, Wash., 1997, Chap. 6 entitled "Preventing Processor Bottlenecks." This reference also discusses limiting the maximum number of threads and limiting the maximum number of connections. Quoting from page 136, "If you cannot upgrade or add processors, consider reducing the maximum number of connections that each IIS service accepts. Limiting connections might result in connections being blocked or rejected, but it helps ensure that accepted connections are processed promptly. . . . In extreme cases of very active or underused processors, you might want to adjust the maximum number of threads in the Inetinfo process."

It may thus be appreciated that while a simple thread model performs adequately for an HTTP server that serves HTML documents, this same model may fail for CPU intensive server-side scripts.

Users desiring to access image information over the Web run up against the bandwidth problem. Whereas even complex text information, such as multiple fonts and scales, can be represented with a few dozen bytes of HTML, images are usually orders of magnitude larger. Images are typically represented in one of two standard formats, JPEG or GIF. Currently, to transmit a small photograph over the Web, such as a 2"×3" photograph scanned in at 300 dots per inch (dpi) and compressed using JPEG, takes more than two minutes over a typical 1 KByte per second connection. This makes the viewing of quality images, such as a small museum painting 10"×10" scanned in at 300 dpi and JPEG compressed, very frustrating.

A recently developed protocol, the Internet Imaging Protocol (IIP), was designed specifically for mitigating the bandwidth problem. It exploits the fact that the client cannot view more than a computer screen of image data at any one time. Even if the full image is enormous, such as 15,000× 15,000 pixels, the client never views more than the screen resolution, usually less than 1,024×1,024 pixels, at any given time. Thus it is unnecessary to transmit more than a screen-ful of data, for any specific view of the image. IIP specifies a method for a client to request portions of an image at a specific resolution. A reference for IIP is the document "Internet Imaging Protocol," ©1997 Hewlett Packard Company, Live Picture, Inc., and Eastman Kodak Company, the contents of which are hereby incorporated by reference.

A server with server-side software that supports IIP is referred to as an "image server." Currently there are two popularly accepted ways to request image data from an image server using IIP; namely, using server-side processing of the request primarily, or using client-side processing primarily. Client-side processing is not relevant to the present invention, and will not be described herein.

To illustrate server-side processing, suppose a client with a viewing window of 640×480 pixels desires to view an image whose full resolution is 15,000×15,000 pixels. The client is unable to view the full image at its original resolution, and can either view the complete image at a low resolution, or view only a portion of the image at a high resolution. Usually the user prefers to begin with an initial view showing the full image at a low resolution, and then to interactively navigate by zooming, i.e., increasing the resolution while decreasing the "field of view," or the portion of the image being viewed, and panning, i.e. translating the current view.

Under IIP, the full image at a 640×480 pixel resolution for an initial view can be requested using the following set of IIP commands:

fif=<image name>&wid=640&hei=480&cvt=jpeg

This request specifies the desired image by means of the fif command, and specifies the width and height of the client viewing window by means of the wid and hei commands, respectively. The last command, cvt, specifies the format of the image to be returned. As mentioned hereinabove, JPEG is supported by most browsers.

For the image server to process the above IIP request, the server must analyze the original image and generate an image matching the requested specifications, specifically the desired portion and dimensions. The analysis and generation are usually computationally expensive. In the example under discussion, a 15,000×15,000 pixel image would have to be re-sized, requiring approximately 675 MBytes to process.

To facilitate this processing, images can be stored in a pre-computed multi-resolution tiled format. Multi-resolution tiled images are constructed by first creating multiple copies of the image at different resolutions. Moreover, at each resolution the image is partitioned into a collection of disjoint tiles.

FLASHPIX®, a registered trademark of the Digital Imaging Group (DIG), is an example of a multi-resolution tiled image format A FlashPix image is constructed by starting with an original image and recursively sub-sampling it at half the resolution. The recursion continues until the final sub-sampled image is reduced to 64 pixels or less in each dimension. Each resolution level is partitioned into tiles that are 64×64 pixels in size. A reference for FLASHPIX® is a document "FlashPix Format Specification," ©1996, 1997, Eastman Kodak Company, the contents of which are hereby incorporated by reference.

Referring to the abovementioned example, for a FlashPix image server to respond with an image at 640×480 pixel resolution that contains the full original image which is sub-sampled, is simply a matter of selecting an appropriate close pre-computed resolution. Using the numbers in the example, the successive resolutions are 15,000×15,000 pixels, then 7,500×7,500 pixels, then 3,750×3,750 pixels, then 1,875×1,875 pixels, then 937×937 pixels, etc. For example, the image server can choose resolution level 937×937 pixels and re-sample to 640×480 pixels. This is far better than working with a 15,000×15,000 pixel image.

FlashPix images are more complicated than simple raster images. The individual 64×64 tiles into which each resolution is partitioned are usually JPEG compressed for Internet applications. Furthermore, the FlashPix format specification requires that the tiles be stored in a storage within a Microsoft OLE structured storage file. Structured storage files are compound files composed of multiple storages and streams, where storages are analogous to folders/directories and streams are analogous to files. Although there is overhead in accessing information inside a structured storage file, such files provide a clean interface for a complicated file structure. Structured storage is discussed in Appendix A of the above-referenced FlashPix Format Specification.

For a FlashPix image server to serve an image portion to a client using server-side processing such as the IIP request mentioned above, the following operations are required:

1. Accept the client connection i. Wait in accept state for a connection ii. Transmit TCP/IP data iii. Hand off request to a second thread iv. Go back into accept state waiting connection 2. Parse the request
   i. Check the syntax of the request
   ii. Format the request into an internal representation
3. Determine the requested tiles
   i. Determine resolution level
   ii. Determine portion
   iii. Determine if re-sampling is necessary
4. Read the tiles from the file
   i. Open the requested structured storage file
   ii. Locate the appropriate storage for the previously determined level of resolution
   iii. Read the meta information (size of tile, location, format, etc.)
   iv. Read the tile data from a stream
5. Decompress the tiles
   i. Apply Huffman decoding
   ii. Apply the Inverse Discrete Cosine Transform
   iii. De-quantize the coefficients
   iv. Convert from YUV(4:1:1) to RGB(8:8:8)
6. Stitch the tiles together to form a contiguous image
   i. Locate positions in memory
   ii. Copy memory with an appropriate offset
   iii. Re-size image to desired dimensions
7. Convert (re-compress) the image into the requested format
   i. Convert from RGB(8:8:8) to YUV(4:1:1)
   ii. Apply the Discrete Cosine Transform
   iii. Quantize
   iv. Apply Huffman encoding
8. Transmit data back to client
   i. Transmit TCP/IP data Assignee's co-pending U.S. patent application Ser. No. 08/979,220 filed Nov. 26, 1997, which issued as U.S. Pat. No. 6,121,970, and entitled A METHOD AND SYSTEM FOR HTML-DRIVEN INTERACTIVE IMAGE CLIENT, the disclosure of which is hereby incorporated by reference, describes a way to view FlashPix images using the IIP cvt command, without the need for a plug-in or a Java applet. Each interactive user navigation command is implemented through a dynamic HTML page containing a cvt command with appropriate parameters. This puts a maximum strain on the server, as nearly all processing is done on the server side.

The invention described in the aforesaid U.S. patent application Ser. No. 08/979,220 filed Nov. 26, 1997, which issued as U.S. Pat. No. 6,121,970, and entitled A METHOD AND SYSTEM FOR HTML-DRIVEN INTERACTIVE IMAGE CLIENT utilizes caching to alleviate the computing burden, so that processed data is immediately available for repeated requests from one or many clients for the same image portion. However, when many images are available on the server, each with many image portions that can be viewed, the server must be able to process many demanding cvt commands that each require the extensive processing delineated above, along with many simple requests that can be satisfied immediately with data in cache, or with very little processing and with requisite fairness.

SUMMARY OF THE INVENTION

In U.S. patent application Ser. No. 08/778,830, filed Jan. 6, 1997 and entitled METHOD AND SYSTEMS FOR SCALABLE REPRESENTATION OF MULTIMEDIA DATA FOR PROGRESSIVE ASYNCHRONOUS TRANSMISSION, pending the disclosure of which is hereby incorporated by reference, there is described a method and system for delivering on-line interactive media over a server-client network, by means of three databases: (i) a server database, (ii) a client database, and (iii) an interactive database. The mode of delivery described therein is one of partitioning the media into blocks, and pushing the successive blocks from server to client in background, as the media is being interactively accessed by a user. The user has little influence over the data content being delivered to the client database, but has great influence over the interactive database, once the client database is sufficiently large.

The present invention seeks to provide a method and system for enabling digital media to be interactively accessed on-line within a server-client network such as the Internet. In distinction to U.S patent application Ser. No. 08/778,830, referenced above, which delivers the entire media file to the user, the present invention operates using a "just enough data" policy. That is, rather than providing all of the media from the server computer to the client computer in background, the only data transmitted from the server to the client is the specific data needed by the user; i.e., the specific data necessary to satisfy the interactive request of the user.

There is thus provided in accordance with a preferred embodiment of the present invention a method for communicating media over a network including encoding the media into a server database at a server, downloading from the server database to a client database generally only those portions of the media which are necessary to satisfy user requests, and in response to a user request for a given item of media, determining whether the media is present in the client database, and if not, automatically downloading those portions of the media which are necessary to supply the user with the given item of media from the server database.

Further in accordance with a preferred embodiment of the present invention the method also includes the step of playing the given item of media to the user.

Still further in accordance with a preferred embodiment of the present invention the method also includes storing in the client database, those portions of the media which are automatically downloaded from the server database, thereby gradually building up the client database.

Moreover in accordance with a preferred embodiment of the present invention the step of playing includes playing a first portion of media received from the client database and playing a second portion of media received from the server database.

Additionally in accordance with a preferred embodiment of the present invention the method also includes identifying which portions of media are needed to satisfy a user request are stored in a client database.

Further in accordance with a preferred embodiment of the present invention the step of identifying includes translating an interactive user request for media into fetch addresses.

Still further in accordance with a preferred embodiment of the present invention the encoding step includes compressing.

Moreover in accordance with a preferred embodiment of the present invention the encoding step includes compressing and also including, prior to the playing step, decompressing the media.

Additionally in accordance with a preferred embodiment of the present invention the identifying step takes place both at the server computer and at a client computer.

Further in accordance with a preferred embodiment of the present invention the media is stored in a directly playable media database prior to playing thereof.

There is also provided in accordance with a preferred embodiment of the present invention apparatus for communicating media over a network including a server which includes a server database having media encoded therein, and a server access controller enabling generally only those portions of the media which are necessary to satisfy user requests to be identified and downloaded from the server database to a client database, and a user computer including a client database, and a client database manager operative to determine whether a user requested item of media is present in the client database and, if such item is not present, to automatically download those portions of the media which are necessary to supply the user with the user requested item of media from the server database via the server access controller.

Further in accordance with a preferred embodiment of the present invention there is also provided a player for playing the given item of media to the user.

Still further in accordance with a preferred embodiment of the present invention there is also provided apparatus for storing in the client database those portions of the media which are automatically downloaded from the server database, so as to gradually build up the client database.

Moreover in accordance with a preferred embodiment of the present invention the player is operative to play a first portion of media received from the client database and to play a second portion of media received from the server database.

Additionally in accordance with a preferred embodiment of the present invention there is also provided an access controller, to identify which portions of media needed to satisfy a user request are stored on a client database.

Further in accordance with a preferred embodiment of the present invention the access controller is also operative to translate an interactive user request for media into fetch addresses.

Still further in accordance with a preferred embodiment of the present invention there is provided an encoder that performs data compression.

Moreover in accordance with a preferred embodiment of the present invention there is provided an encoder that performs data compression and a decompressor that performs data decompression prior to playing.

Additionally in accordance with a preferred embodiment of the present invention the access controller includes both a server access controller and a client access controller.

Further in accordance with a preferred embodiment of the present invention there is also provided a directly playable media database for storing media prior to playing it.

The present invention also provides a method and system for managing multiple threads to handle requests. As mentioned hereinabove, if requests are processed by a single thread, then when one request is being processed, all subsequent requests have to wait for the first request to finish. If one of the requests takes an excessive amount of time, all subsequent requests are stuck.

The present invention describes a dynamic functionality for thread management, in which additional threads are created and destroyed during processing, depending on how busy the server gets.

As noted above, in the prior art there are two extreme approaches to thread management, neither of which is optimal. The first extreme approach is to restrict to a small number of threads, perhaps even a single thread. This approach has an advantage in that it minimizes overhead involved in operating multiple threads, but it also has a disadvantage in that requests must wait in a queue until the thread is free to accept them. The second extreme approach is to create a large number of threads. This approach has an advantage in that requests are accepted immediately upon arrival, but it also has a disadvantage in that there is great overhead due to operating multiple threads.

Prior art systems for thread management, such as Microsoft IIS and Netscape Enterprise, base their thread management on monitoring client requests. The present invention, in distinction, describes a system that monitors threads.

In a preferred embodiment, the system of the present invention initially creates a small number of threads residing in a thread pool. The threads in the thread pool are monitored for determining how busy they are. Specifically, a special "watchdog" thread is used to monitor the threads and to increment a tick counter associated with each active thread in the thread pool at regular time intervals of 50 msec. A thread's tick counter is set to zero upon start of its activity. Then, at each regular interval when the "watchdog" does its monitoring, the tick counters of the active threads are each incremented by one tick. The tick counters continue to be incremented as long as the threads remain active.

When a request queues up, the system of the present invention does not immediately create a new thread. Rather, the "watchdog" manages thread creation. Whenever the "watchdog" finds, during its regular check, that the tick counter of a thread has reached 3, it then lowers the priority of this thread and removes it from the thread pool, and creates a new thread to replace it. The old thread that was removed from the thread pool completes its task and dies. Immediately upon its creation, the new thread is free to process a request in the queue. Thus the total number of threads in the thread pool remains a constant.

Since the "watchdog" does its monitoring at regular intervals of 50 msec, and since it removes an active thread from the thread pool when 3 ticks have been registered in the active thread, it turns out that the time during which an active thread can remain in the thread pool is somewhere between 101 msecs and 150 msecs. Since a new thread is created when an active thread is removed from the thread pool, this is also the maximum time the request queue can build up without any of the queued requests being handled.

Thus the present invention seeks to optimize the number of concurrent active threads and their priorities, in order to handle requests as efficiently as possible while minimizing overhead involved in operating multiple threads.

There is thus provided in accordance with a preferred embodiment of the present invention an image server including at least one processor operative to supply portions of image data to clients in response to multiple requests therefrom, and thread management software operating the at least one processor by causing it to process the requests using at least one of a plurality of threads, the thread management software being characterized in that it initiates a new thread when an existing thread has exceeded a predetermined metric of busyness.

Moreover in accordance with a preferred embodiment of the present invention the thread management software is characterized in that it initiates a new thread only when an existing thread has exceeded the predetermined metric of busyness.

Additionally in accordance with a preferred embodiment of the present invention the thread management software operates a thread pool containing at least one of the plurality of threads.

Further in accordance with a preferred embodiment of the present invention the thread management software initiates a new thread when an existing thread in the thread pool has exceeded the predetermined metric of busyness.

Still further in accordance with a preferred embodiment of the present invention the thread management software initiates a new thread only when an existing thread in the thread pool has exceeded the predetermined metric of busyness.

Moreover in accordance with a preferred embodiment of the present invention the thread management software is operative to open a socket connection for each new incoming request accepted by a thread for processing.

Additionally in accordance with a preferred embodiment of the present invention each existing thread can be in an active state or in a wait state.

Further in accordance with a preferred embodiment of the present invention threads belonging to the thread pool are characterized in that they enter the wait state upon completion of a client request, and are not destroyed.

Still further in accordance with a preferred embodiment of the present invention at least one of the plurality of threads does not belong to the thread pool and is characterized in that it is destroyed upon completion of a client request.

Moreover in accordance with a preferred embodiment of the present invention all of the threads which do not belong to the thread pool are characterized in that they are destroyed upon completion of a client request.

Further in accordance with a preferred embodiment of the present invention the new thread is added to the thread pool.

Additionally in accordance with a preferred embodiment of the present invention if the existing thread belongs to the thread pool, the thread management software is operative to remove the existing thread from the thread pool when the existing thread has exceeded the predetermined metric of busyness.

Further in accordance with a preferred embodiment of the present invention each of the plurality of threads has an associated priority.

Still further in accordance with a preferred embodiment of the present invention the thread management software lowers the priority of the existing thread when the existing thread has exceeded the predetermined metric of busyness.

Moreover in accordance with a preferred embodiment of the present invention the predetermined metric of busyness is a predetermined time duration measured during activity of a thread.

Additionally in accordance with a preferred embodiment of the present invention the predetermined metric of busyness is a predetermined time duration measured during activity of a thread.

Further in accordance with a preferred embodiment of the present invention the predetermined metric of busyness is a predetermined amount of disk access activity.

Still further in accordance with a preferred embodiment of the present invention the predetermined metric of busyness is a predetermined amount of memory allocation.

Moreover in accordance with a preferred embodiment of the present invention the predetermined time duration is determined by incrementing ticks for each thread which is in an active state following initiation of its activity and at fixed time intervals.

Additionally in accordance with a preferred embodiment of the present invention the predetermined time duration is determined by incrementing ticks for each thread which is in an active state following initiation of its activity at fixed time intervals which are not measured from the onset of its activity.

Further in accordance with a preferred embodiment of the present invention the predetermined time duration is determined by incrementing ticks for each thread which is in an active state following initiation of its activity at fixed time intervals which are not measured from the onset of its activity.

Still further in accordance with a preferred embodiment of the present invention the fixed time intervals are 50 msecs, and the predetermined time duration is the time expended until three ticks have been incremented.

Moreover in accordance with a preferred embodiment of the present invention the image data is FLASHPIX image data.

Additionally in accordance with a preferred embodiment of the present invention the multiple requests are Internet Imaging Protocol (IIP) requests.

There is also provided in accordance with a preferred embodiment of the present invention a computer thread management system including at least one processor, and thread management software operating the at least one processor by causing it to process requests using at least one of a plurality of threads, the thread management software being characterized in that it initiates a new thread only when an existing thread has exceeded a predetermined metric of busyness.

Moreover in accordance with a preferred embodiment of the present invention the thread management software is characterized in that it initiates a new thread only when an existing thread has exceeded the predetermined metric of busyness.

Additionally in accordance with a preferred embodiment of the present invention the thread management software operates a thread pool containing at least one of the plurality of threads.

Further in accordance with a preferred embodiment of the present invention the thread management software initiates a new thread when an existing thread in the thread pool has exceeded the predetermined metric of busyness.

Still further in accordance with a preferred embodiment of the present invention the thread management software initiates a new thread only when an existing thread in the thread pool has exceeded the predetermined metric of busyness.

Moreover in accordance with a preferred embodiment of the present invention the thread management software is operative to open a socket connection for each new incoming request accepted by a thread for processing.

Additionally in accordance with a preferred embodiment of the present invention each existing thread can be in an active state or in a wait state.

Further in accordance with a preferred embodiment of the present invention threads belonging to the thread pool are characterized in that they enter the wait state upon completion of a client request, and are not destroyed.

Still further in accordance with a preferred embodiment of the present invention at least one of the plurality of threads does not belong to the thread pool and is characterized in that it is destroyed upon completion of a client request.

Moreover in accordance with a preferred embodiment of the present invention all of the threads which do not belong to the thread pool are characterized in that they are destroyed upon completion of a client request.

Further in accordance with a preferred embodiment of the present invention the new thread is added to the thread pool.

Additionally in accordance with a preferred embodiment of the present invention if the existing thread belongs to the thread pool, the thread management software is operative to remove the existing thread from the thread pool when the existing thread has exceeded the predetermined metric of busyness.

Further in accordance with a preferred embodiment of the present invention each of the plurality of threads has an associated priority.

Still further in accordance with a preferred embodiment of the present invention the thread management software lowers the priority of the existing thread when the existing thread has exceeded the predetermined metric of busyness.

Moreover in accordance with a preferred embodiment of the present invention the predetermined metric of busyness is a predetermined time duration measured during activity of a thread.

Additionally in accordance with a preferred embodiment of the present invention the predetermined metric of busyness is a predetermined time duration measured during activity of a thread.

Further in accordance with a preferred embodiment of the present invention the predetermined metric of busyness is a predetermined amount of disk access activity.

Still further in accordance with a preferred embodiment of the present invention the predetermined metric of busyness is a predetermined amount of memory allocation.

Moreover in accordance with a preferred embodiment of the present invention the predetermined time duration is determined by incrementing ticks for each thread which is in an active state following initiation of its activity and at fixed time intervals.

Additionally in accordance with a preferred embodiment of the present invention the predetermined time duration is determined by incrementing ticks for each thread which is in an active state following initiation of its activity at fixed time intervals which are not measured from the onset of its activity.

Further in accordance with a preferred embodiment of the present invention the predetermined time duration is determined by incrementing ticks for each thread which is in an active state following initiation of its activity at fixed time intervals which are not measured from the onset of its activity.

Still further in accordance with a preferred embodiment of the present invention the fixed time intervals are 50 msecs, and the predetermined time duration is the time expended until three ticks have been incremented.

There is also provided in accordance with a preferred embodiment of the present invention an image server method including operating at least one processor for supplying portions of image data to clients in response to multiple requests therefrom including managing processing threads within the at least one processor, thereby causing the processor to process the requests using at least one of a plurality of threads, characterized in that a new thread is initiated when an existing thread has exceeded a predetermined metric of busyness.

Moreover in accordance with a preferred embodiment of the present invention the managing step initiates a new thread only when an existing thread has exceeded the predetermined metric of busyness.

Additionally in accordance with a preferred embodiment of the present invention the managing step operates a thread pool containing at least one of the plurality of threads.

Further in accordance with a preferred embodiment of the present invention the managing step initiates a new thread when an existing thread in the thread pool has exceeded the predetermined metric of busyness.

Still further in accordance with a preferred embodiment of the present invention the managing step initiates a new thread only when an existing thread in the thread pool has exceeded the predetermined metric of busyness.

Moreover in accordance with a preferred embodiment of the present invention the managing step includes opening a socket connection for each new incoming request accepted by a thread for processing.

Additionally in accordance with a preferred embodiment of the present invention each existing thread can be in an active state or in a wait state.

Further in accordance with a preferred embodiment of the present invention threads belonging to the thread pool are characterized in that they enter the wait state upon completion of a client request, and are not destroyed.

Still further in accordance with a preferred embodiment of the present invention at least one of the plurality of threads does not belong to the thread pool and is characterized in that it is destroyed upon completion of a client request.

Moreover in accordance with a preferred embodiment of the present invention all of the threads which do not belong to the thread pool are characterized in that they are destroyed upon completion of a client request.

Further in accordance with a preferred embodiment of the present invention the new thread is added to the thread pool.

Additionally in accordance with a preferred embodiment of the present invention if the existing thread belongs to the thread pool, the managing step includes removing the existing thread from the thread pool when the existing thread has exceeded the predetermined metric of busyness.

Further in accordance with a preferred embodiment of the present invention each of the plurality of threads has an associated priority.

Still further in accordance with a preferred embodiment of the present invention the managing step includes lowering the priority of the existing thread when the existing thread has exceeded the predetermined metric of busyness.

Moreover in accordance with a preferred embodiment of the present invention the predetermined metric of busyness is a predetermined time duration measured during activity of a thread.

Additionally in accordance with a preferred embodiment of the present invention the predetermined metric of busyness is a predetermined time duration measured during activity of a thread.

Further in accordance with a preferred embodiment of the present invention the predetermined metric of busyness is a predetermined amount of disk access activity.

Still further in accordance with a preferred embodiment of the present invention the predetermined metric of busyness is a predetermined amount of memory allocation.

Moreover in accordance with a preferred embodiment of the present invention the predetermined time duration is determined by incrementing ticks for each thread which is in an active state following initiation of its activity and at fixed time intervals.

Additionally in accordance with a preferred embodiment of the present invention the predetermined time duration is determined by incrementing ticks for each thread which is in an active state following initiation of its activity at fixed time intervals which are not measured from the onset of its activity.

Further in accordance with a preferred embodiment of the present invention the predetermined time duration is determined by incrementing ticks for each thread which is in an active state following initiation of its activity at fixed time intervals which are not measured from the onset of its activity.

Still further in accordance with a preferred embodiment of the present invention the fixed time intervals are 50 msecs, and the predetermined time duration is the time expended until three ticks have been incremented.

Moreover in accordance with a preferred embodiment of the present invention the image data is FLASHPIX image data.

Additionally in accordance with a preferred embodiment of the present invention the multiple requests are Internet Imaging Protocol (IIP) requests.

There is also provided in accordance with a preferred embodiment of the present invention a computer thread management method including operating at least one processor, including utilizing thread management software operating the at least one processor by causing it to process requests using at least one of a plurality of threads, the thread management software being characterized in that it initiates a new thread only when an existing thread has exceeded a predetermined metric of busyness.

Moreover in accordance with a preferred embodiment of the present invention the thread management software is characterized in that it initiates a new thread only when an existing thread has exceeded the predetermined metric of busyness.

Additionally in accordance with a preferred embodiment of the present invention the thread management software operates a thread pool containing at least one of the plurality of threads.

Further in accordance with a preferred embodiment of the present invention the thread management software initiates a new thread when an existing thread in the thread pool has exceeded the predetermined metric of busyness.

Still further in accordance with a preferred embodiment of the present invention the thread management software initiates a new thread only when an existing thread in the thread pool has exceeded the predetermined metric of busyness.

Moreover in accordance with a preferred embodiment of the present invention the thread management software opens a socket connection for each new incoming request accepted by a thread for processing.

Additionally in accordance with a preferred embodiment of the present invention each existing thread can be in an active state or in a wait state.

Further in accordance with a preferred embodiment of the present invention threads belonging to the thread pool are characterized in that they enter the wait state upon completion of a client request, and are not destroyed.

Still further in accordance with a preferred embodiment of the present invention at least one of the plurality of threads does not belong to the thread pool and is characterized in that it is destroyed upon completion of a client request.

Moreover in accordance with a preferred embodiment of the present invention all of the threads which do not belong to the thread pool are characterized in that they are destroyed upon completion of a client request.

Further in accordance with a preferred embodiment of the present invention the new thread is added to the thread pool.

Additionally in accordance with a preferred embodiment of the present invention if the existing thread belongs to the thread pool, the thread management software removes the existing thread from the thread pool when the existing thread has exceeded the predetermined metric of busyness.

Further in accordance with a preferred embodiment of the present invention each of the plurality of threads has an associated priority.

Still further in accordance with a preferred embodiment of the present invention the thread management software lowers the priority of the existing thread when the existing thread has exceeded the predetermined metric of busyness.

Moreover in accordance with a preferred embodiment of the present invention the predetermined metric of busyness is a predetermined time duration measured during activity of a thread.

Additionally in accordance with a preferred embodiment of the present invention the predetermined metric of busyness is a predetermined time duration measured during activity of a thread.

Further in accordance with a preferred embodiment of the present invention the predetermined metric of busyness is a predetermined amount of disk access activity.

Still further in accordance with a preferred embodiment of the present invention the predetermined metric of busyness is a predetermined amount of memory allocation.

Moreover in accordance with a preferred embodiment of the present invention the predetermined time duration is determined by incrementing ticks for each thread which is in an active state following initiation of its activity and at fixed time intervals.

Additionally in accordance with a preferred embodiment of the present invention the predetermined time duration is determined by incrementing ticks for each thread which is in an active state following initiation of its activity at fixed time intervals which are not measured from the onset of its activity.

Further in accordance with a preferred embodiment of the present invention the predetermined time duration is determined by incrementing ticks for each thread which is in an active state following initiation of its activity at fixed time intervals which are not measured from the onset of its activity.

Still further in accordance with a preferred embodiment of the present invention the fixed time intervals are 50 msecs, and the predetermined time duration is the time expended until three ticks have been incremented.

There is also provided in accordance with a preferred embodiment of the present invention a computer thread management system for processing multiple requests by using at least one of a plurality of processing threads including thread monitoring software monitoring the plurality of processing threads, and thread management software managing the plurality of processing threads based upon output from the thread monitoring software.

Moreover in accordance with a preferred embodiment of the present invention the output from the thread monitoring software is a measure of thread busyness.

Additionally in accordance with a preferred embodiment of the present invention the thread management software initiates new threads.

Further in accordance with a preferred embodiment of the present invention the thread management software lowers thread priorities.

Still further in accordance with a preferred embodiment of the present invention the thread management software preserves some of the plurality of threads after processing one of the multiple requests by putting them into a wait state.

Moreover in accordance with a preferred embodiment of the present invention the thread management software allows some of the plurality of threads to be destroyed after processing one of the multiple requests.

There is also provided in accordance with a preferred embodiment of the present invention a computer thread management method for processing multiple requests using at least one of a plurality of processing threads including monitoring the plurality of processing threads; and managing the plurality of processing threads based upon output from the monitoring step.

Moreover in accordance with a preferred embodiment of the present invention the output from the monitoring step is a measure of thread busyness.

Additionally in accordance with a preferred embodiment of the present invention the managing step initiates new threads.

Further in accordance with a preferred embodiment of the present invention the managing step lowers thread priorities.

Still further in accordance with a preferred embodiment of the present invention the managing step preserves some of the plurality of threads after processing one of the multiple requests by putting them into a wait state.

Moreover in accordance with a preferred embodiment of the present invention the thread management software allows some of the plurality of threads to be destroyed after processing one of the multiple requests.

BRIEF DESCRIPTION OF THE DRAWINGS

The present invention will be understood and appreciated more fully from the following detailed description, taken in conjunction with the drawings in which.

LIST OF APPENDICES

Appendix A is a listing of exemplary server-side software, in the form of Java code, for implementing thread management in accordance with a preferred embodiment of the present invention.

DETAILED DESCRIPTION OF PREFERRED EMBODIMENTS

Figure 1:
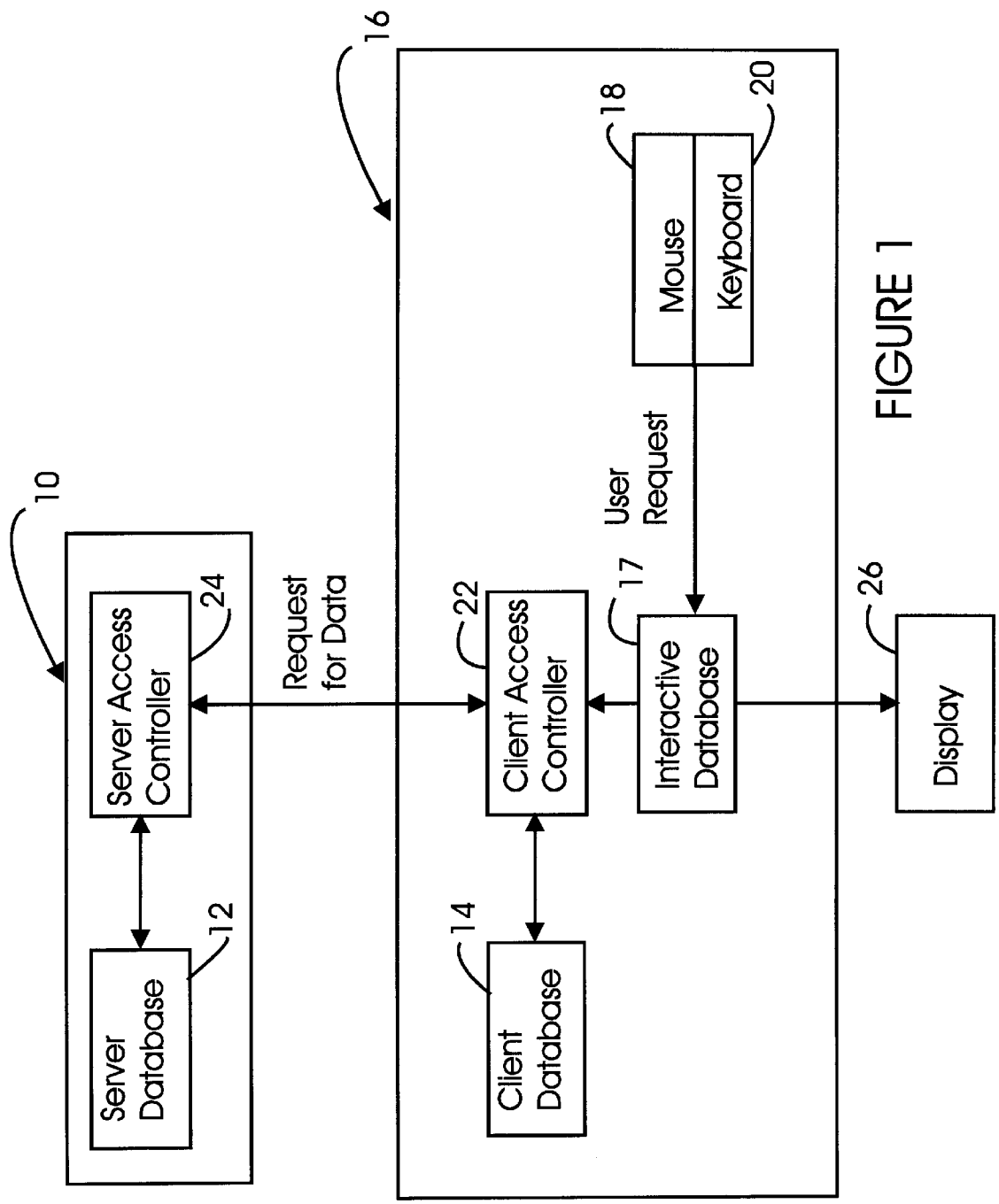
FIG. 1 is a simplified illustration of a system and method for transmitting digital media data from a server to a client in accordance with a preferred embodiment of the present invention.

Reference is now made to FIG. 1, which is a simplified illustration of a system and method for transmitting digital media data from a server to a client in accordance with a preferred embodiment of the present invention. Digital media is encoded and stored on a server computer 10 within a database 12, for interactive access by users who are networked to the server computer. Interactive access can involve viewing the media, if it is an image, playing it, if it is a movie, or listening to it, if it is an audio signal.

The basic principle of the present invention is for the server to send just enough data to enable the interactive access which the user desires. The data is managed through the use of two databases: the server database 12, residing on the server computer 10, and a client database 14, which is built up on a client computer 16 dynamically, as data is streamed from the server to the client.

Typically the server and client databases contain encoded data, compressed to minimize transmission time. In view of the use of compressed data, there may also optionally be employed a third database 17, as described in U.S. patent application Ser. No. 08/778,830, referenced above. The third database is an interactive database on the client computer, which contains decoded data, ready for instant access and which serves as a directly playable media database.

For example, suppose the media is a large still image at which the user is gazing, and that the server database contains multiple tiles of the image at different resolutions. When the user initiates a request to gaze at a portion of the image, using a mouse 18 or keyboard 20, the only data transmitted consists of the specific tiles at the specific resolution which are to be displayed. None of the other tiles are transmitted. As the user proceeds to gaze and pan through the image, additional tiles are sent.

The collection of tiles received by the client computer 16 is stored locally in the client computer, in the client database 14. Since the received tiles are thus locally available to the client, whenever the user requests data that was previously accessed, that data can be accessed locally, without the need to transmit it from the server. Since interactive applications typically involve repeated access to the same data, the client database 14 serves to speed up the interactivity as database 14 is built up.

As another example, suppose the media is a movie that the user is viewing. When the user initiates a request to view a specific frame of the movie, the only data transmitted is that specific frame. None of the other frames are transmitted. As the user advances forward and backward within the movie, additional frames are sent. The frames received by the client computer 16 are stored locally in the client database 14, so that whenever the user returns to a frame which was previously viewed, the data is readily available on the local computer.

Interactive commands input by means of a mouse 18 and keyboard 20 are used to zoom in and out, pan, advance frames, and link to other parts of the media by means of hot spots. Any client computer 16 which is networked to the server can access the media. When a user issues an interactive command, a client access controller 22 identifies the portion of the digital media that is necessary to fulfill the user's request. Initially, before a client database 14 is built up, the client access controller 22 issues a request to a server access controller 24 in the server computer for the data it has identified. Access controller 24 fetches from server database 12 only the portion of data necessary to fulfill the user's request, and then transmits it to the client computer.

The data received by the client computer is then delivered to display 26. In addition, the data is stored in the client database 14. Once the client database is no longer empty, the client access controller 22 first checks whether all of the data it seeks in order to fulfill the user's request is already available in the client database 14. If so, it does not send a request to the server computer, but rather delivers the data from the client database to display 26. Otherwise, it issues a request to the server database 12 via controller 24, as described above, for such data which is not yet available in the client database 14. Once the server transmits such data, the received data is incorporated in the client database 14.

Figure 2:
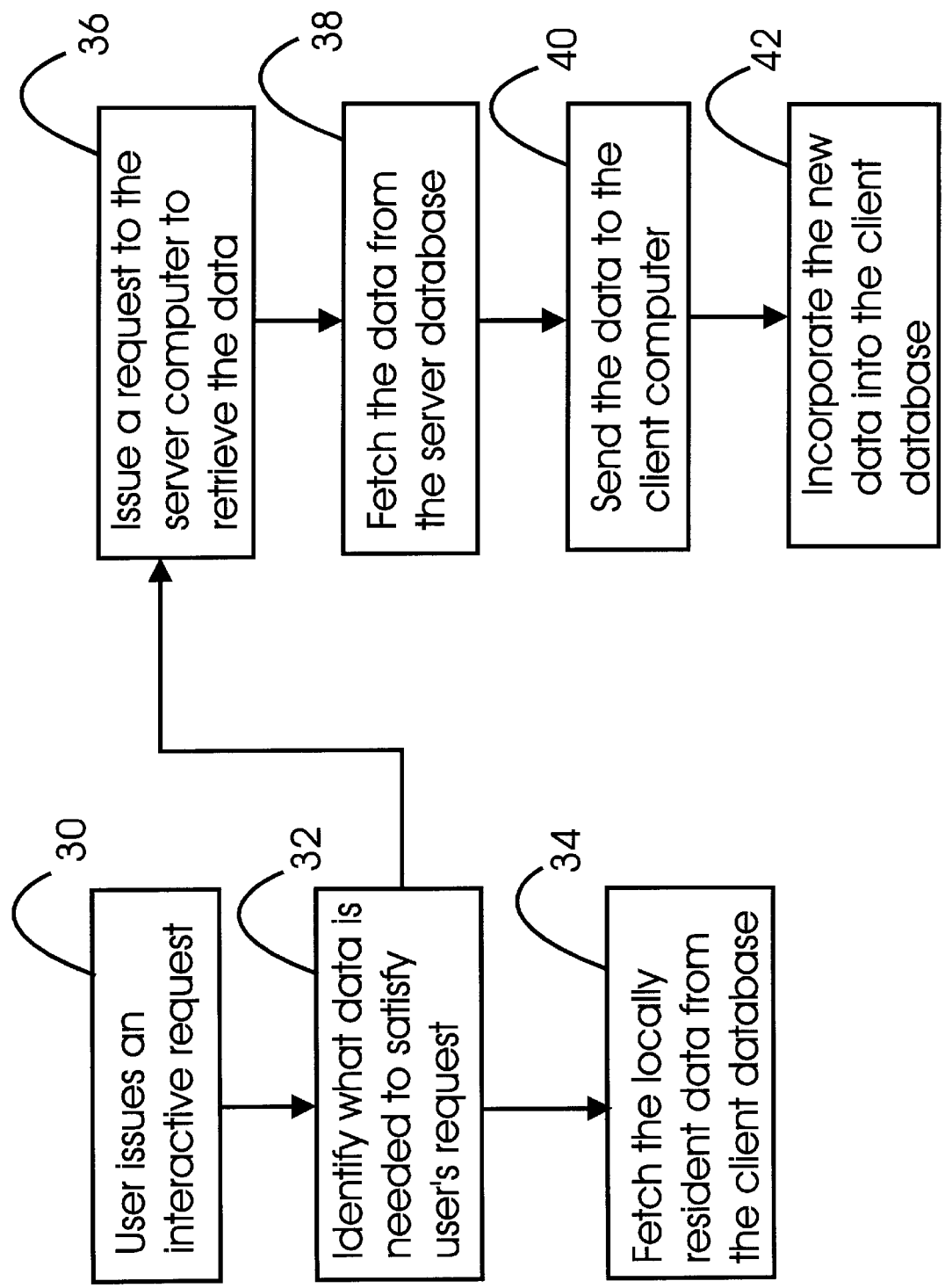
FIG. 2 is a simplified flowchart illustrating operation of the system and method of FIG. 1.

Reference is now made to FIG. 2, which is a simplified flowchart illustrating the operation of the system and method of FIG. 1. At step 30 a user of a client computer initiates an interactive request to access media which is stored on a remote server computer. At step 32 the client computer identifies what data is necessary in order to satisfy the user's request.

To the extent that the data already resides in the local client database, the data is fetched at step 34 directly from the local computer. To the extent that the data does not already reside in the local client database, at step 36 a request is issued to the server computer to provide the necessary data. At step 38 the server computer fetches the data from its database, and at step 40 the fetched data is sent to the client computer for user access. Finally, at step 42, the received data is added to the client database.

The present invention additionally concerns a method and system for managing multiple threads to handle requests. It describes a way to monitor threads, to use results of the monitoring to manage the threads in an optimal way, and to decide when it is appropriate to initiate a new thread. The monitoring itself can be carried out in its own processing thread. The monitoring system is referred to hereinbelow as a "watchdog."

Prior art systems for thread management, such as those of Microsoft IIS and Netscape Enterprise, base their thread management on monitoring client requests. The present invention, in distinction, describes a system that monitors threads.

In a preferred embodiment, the system of the present invention operates on a thread pool that includes a plurality of threads. These threads can be in an active state or in a wait state. A thread is in an active state when it is busy processing a request. It is in a wait state when it is idle. There can also be additional threads that do not belong to the thread pool. Whereas the threads in the thread pool move into a wait state upon completion of a request, and are not destroyed, threads that do not belong to the thread pool are destroyed upon completion of a request.

The watchdog monitors the status of the threads in the thread pool at regular times, here termed "fixed checkpoint times". Based on specific criteria, the watchdog uses the results of the monitoring, here termed "check results", to decide whether or not to initiate new threads, and, if so, how many new threads to initiate. It also removes certain threads, here termed "slow threads", from the thread pool and lowers their priorities, if the watchdog considers such threads too busy. This is in fair deference to other requests, since a busy thread is usually a reflection of a very demanding client request.

In a preferred embodiment, the system of the present invention initially creates a small number of threads residing in a thread pool. The threads in the thread pool are monitored in order to determine how busy they are. Specifically, a special watchdog thread is used to monitor the threads and to increment a tick counter associated with each active thread in the thread pool at regular time intervals of 50 msec.

A thread's tick counter is set to zero upon the start of its activity. Then, at each regular interval when the watchdog does its monitoring, the tick counters of the active threads are each incremented by one tick. The tick counters continue to be incremented as long as the threads remain active. When a thread in the thread pool completes a request and enters a wait state, its tick counter is reset to zero.

When a request queues up, the system of the present invention does not immediately create a new thread. Rather, the watchdog manages the threads. Whenever the watchdog discovers, during its regular check, that the tick counter of a thread has reached 3, it then lowers the priority of this thread and removes it from the thread pool, and creates a new thread to replace it. The old thread that was removed from the thread pool completes its task and dies. The new thread, immediately upon its creation, is free to process a request in the queue if a queued request exists. Otherwise the thread waits for a request. Thus the total number of threads in the thread pool remains a constant.

Since the watchdog does its checks at regular intervals of 50 msec, and since it removes an active thread from the thread pool when 3 ticks have been registered in the active thread, it turns out that the maximum time during which an active thread can remain in the thread pool is somewhere between 101 msecs and 150 msecs. The 101 msecs corresponds to a thread that started activity at exactly a watchdog checkpoint time, and the 150 msecs corresponds to a thread that started its activity 1 msec after a watchdog checkpoint time. Since a new thread is created when an active thread is removed from the thread pool, this maximum time is also the maximum time that a request queue can build up without any of the queued requests being handled.

The use of ticks is believed to be more efficient than having the watchdog continuously request the system time and compare it to the exact time a thread initiated processing, although the use of system time is more exact.

Thus the present invention seeks to optimize the number of concurrent active threads and their priorities, in order to handle requests as efficiently as possible while minimizing overhead due to operating multiple threads.

Figure 3:
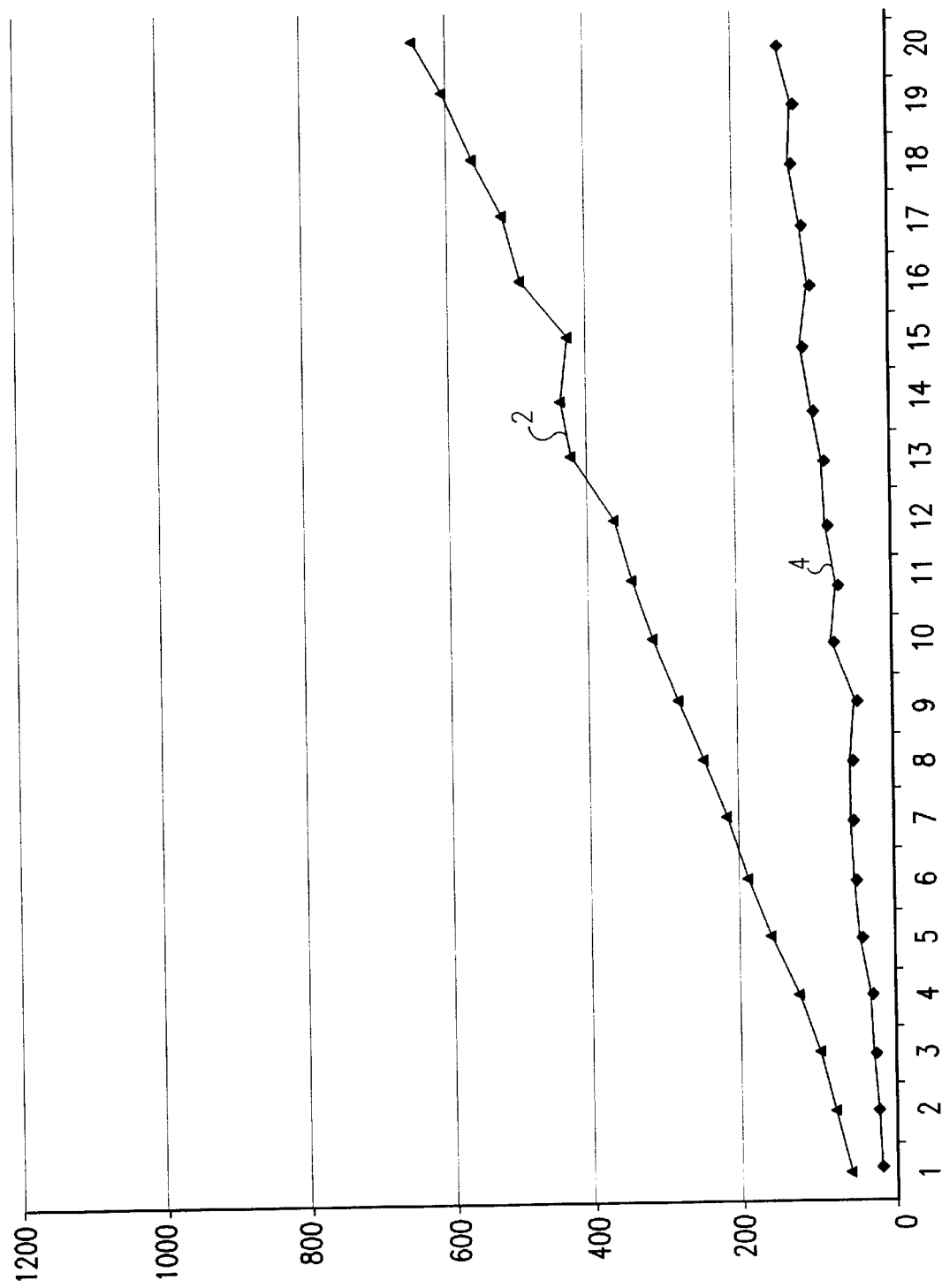
FIG. 3 is a graph depicting an advantage which the present invention offers over the prior art.

Reference is now made to FIG. 3, which is a graph depicting an advantage which the present invention offers over the prior art. The graph comes from a server test that was run using requests from simulated clients. Multiple simulated clients each requested access to less than one KByte of data, repeatedly. As the number of multiple clients was varied, the average response time, averaged over 100 repeated requests, for one of the clients was recorded.

The horizontal axis of the graph indicates the number of clients simultaneously making requests, and the vertical axis indicates the average response time, averaged over 100 repeated requests, for a single request (in msec). The curve labeled 102 illustrates the performance of a prior art IIS server, using the thread functionality described hereinabove in the background, wherein a maximum number of threads is pre-set. In the IIS server, multiple threads are created as requests are received, one for each anticipated request. When the maximum limit of allowable concurrent requests/threads is reached, subsequent requests are queued pending availability of a free thread. The IIS server represented by the curve 102 manages its threads by monitoring requests.

Figure 4:
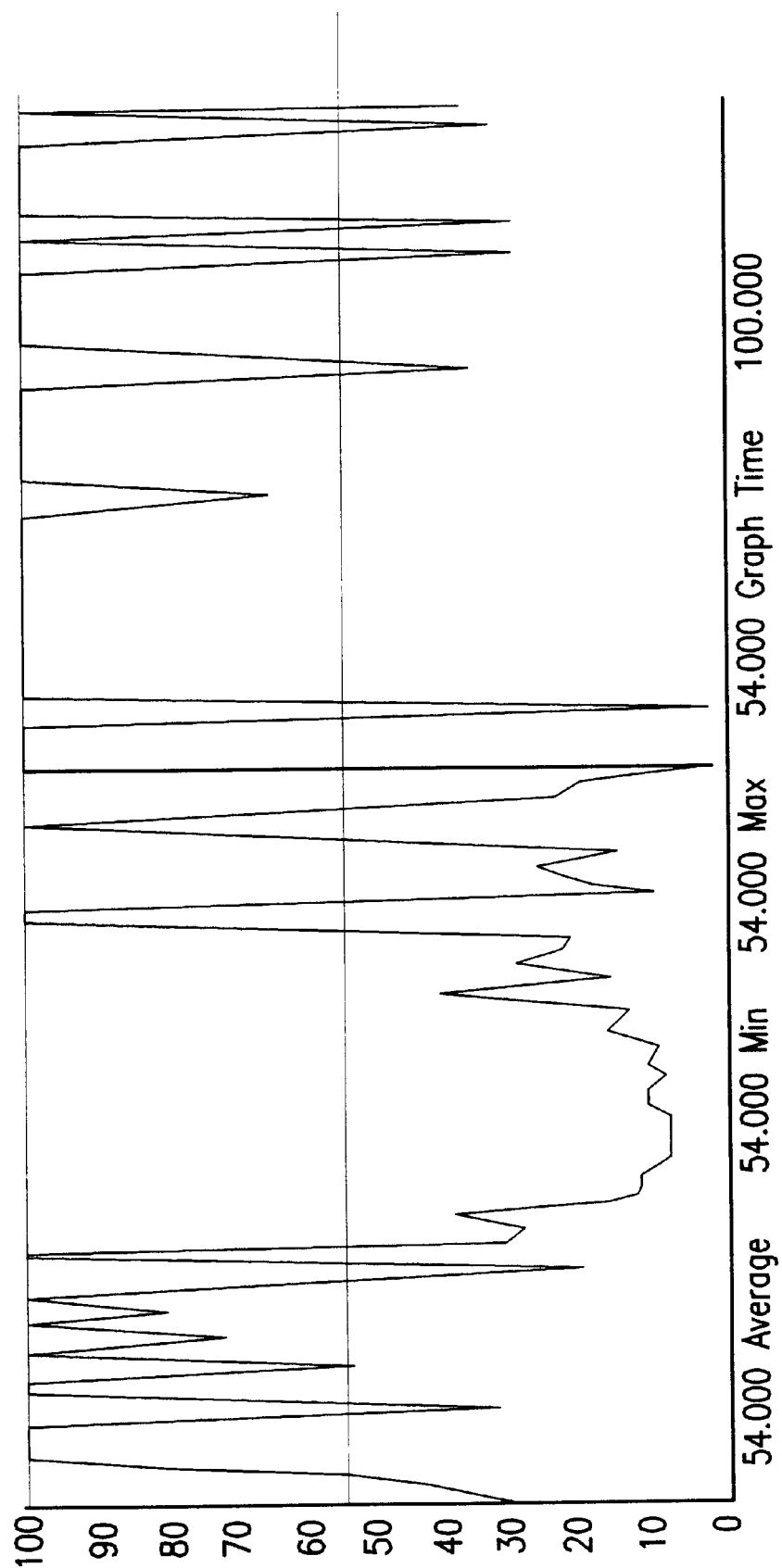
FIG. 4 is a screen copy of a performance monitoring graph, explaining behavior corresponding generally to one of the plots in FIG. 3 representing the prior art.

A performance monitor was run while the above server test was being conducted, and a screen copy of monitor output for the IIS servers is presented in FIG. 4. As can be seen, the IIS server allocated approximately 54 threads. The spikes in the graph correspond to page faults, whereby threads requested pages of memory not readily available. As can be seen in FIG. 4, 15 page faults occurred during the 100 second duration of the graph. This is typical when many threads are active.

The curve labeled 104 in FIG. 3 corresponds to a server using a preferred embodiment of the present invention, and is approximately four times faster than the IIS server. This is because the present invention dynamically allocates threads using a "watchdog" algorithm to monitor threads rather than requests, and was able to process all of the client requests with only 2–3 threads.

The IIS server allocated approximately 54 threads, and assigned threads to each client. These threads competed for memory pages, and as a result page faults were rampant.

In contrast, the server of the present invention, whose performance is indicated in curve 104 waited a short time (approximately 150 msec.) before assigning threads to client requests, to see if an active thread in the thread pool would be freed up and could then be re-used for processing a queued request. Even though the client requests had to wait in a queue, the overall performance was better due to the fact that there were a smaller number of concurrent active threads. Using the IIS server, client requests did not necessarily have to wait in a queue, and were immediately assigned to a waiting thread, but the proliferation of threads caused enough page faults that the overall performance was worse.

Figure 5:
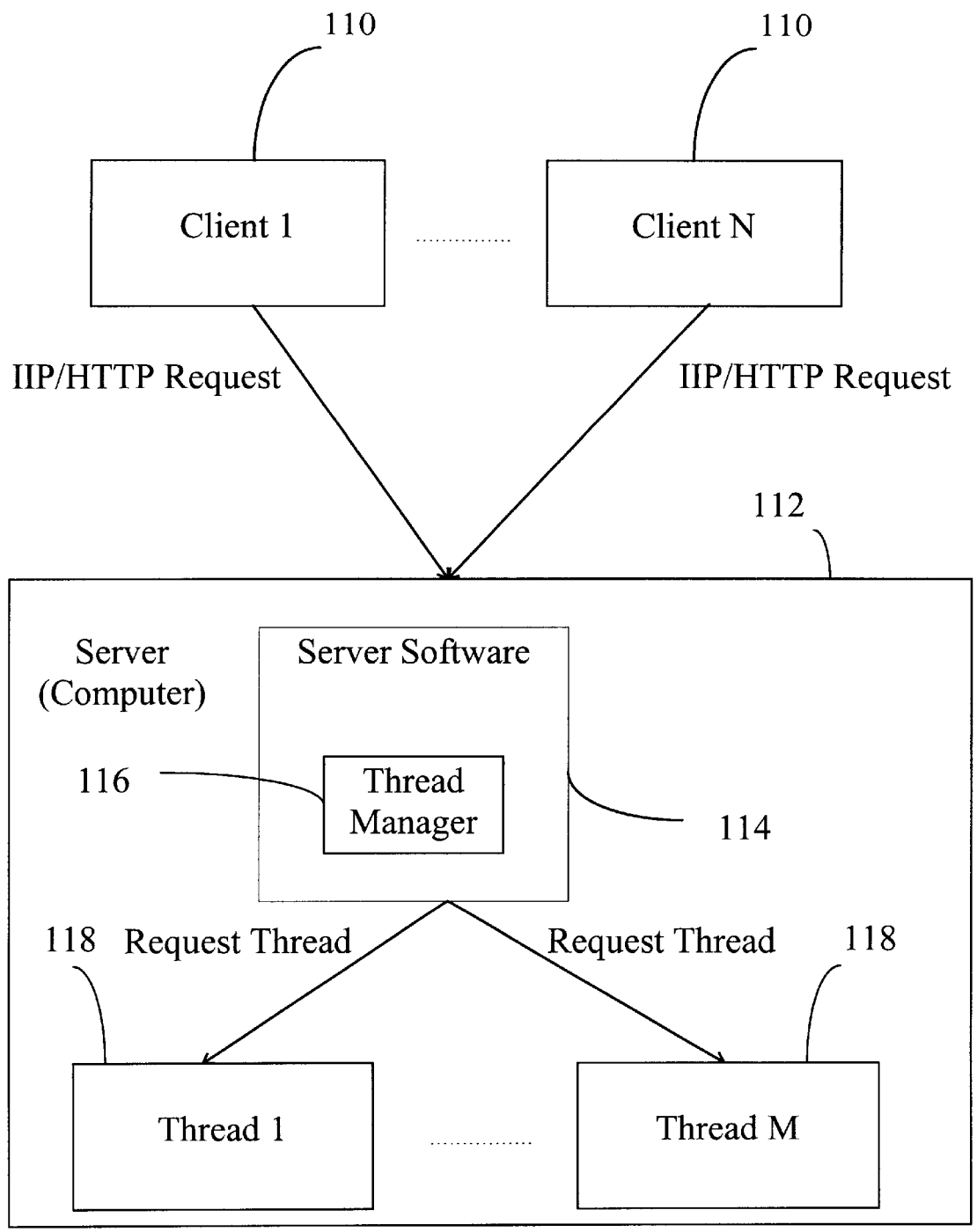
FIG. 5 is a simplified illustration of a client server system that uses thread management in accordance with a preferred embodiment of the present invention.

Reference is now made to FIG. 5, which is a simplified illustration of a client server system that uses thread management in accordance with a preferred embodiment of the present invention. FIG. 5 describes the relationship between a client's request to an image server and the threads managed by the image server to process the request. A client 110 sends a request via IIP, that resides within the HTTP request. This request reaches a server computer 112, which contains server software 114 operative to accept the request and initiate the processing of the request. Processing of the request may entail utilization of a request thread.

During the processing of the request, thread manager 116 concurrently monitors the currently running request threads 118. If a request thread 118 exceeds a maximum limit of processing time allocated per thread, then thread manager 116 performs operations to optimize the performance. These optimizing operations may include creating a new thread and lowering the priority of the thread that exceeded its limit.

Figure 6:
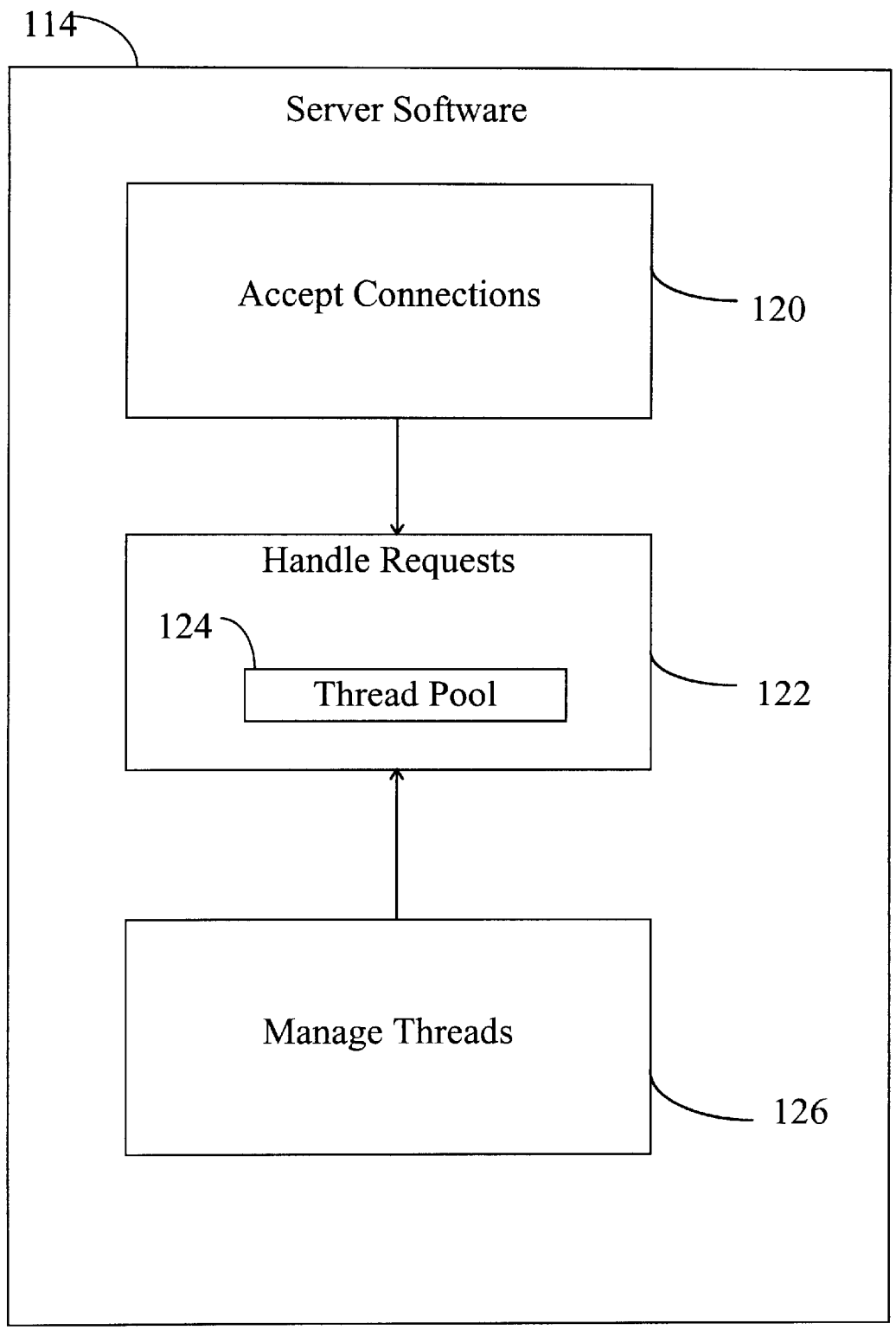
FIG. 6 is a simplified flowchart of server software within the system of FIG. 5.

Reference is now made to FIG. 6, which depicts three main actions that occur concurrently in the server software 114. Each of these actions is enabled by its own set of threads. To accept connections the server software 114 must go into a blocking method, termed accept ( ). In order that the remainder of the server software 114 will not also be blocked, an Accept Connections step 120 is run in a separate thread. Typically in order to enable an administrator of the image server to stop the server software 114, the Accept Connections step 120 runs the accept method with a timeout of 2 seconds. The accept method is run in a loop, in which a condition for exit from the loop is an administrator request to stop the image server.

Once a connection has been established, the accept method returns a socket object. A socket is described by the four-tuple: remote ip address, remote port, local ip address and local port. The socket object can be used for continued communication with the client.

Figure 7:
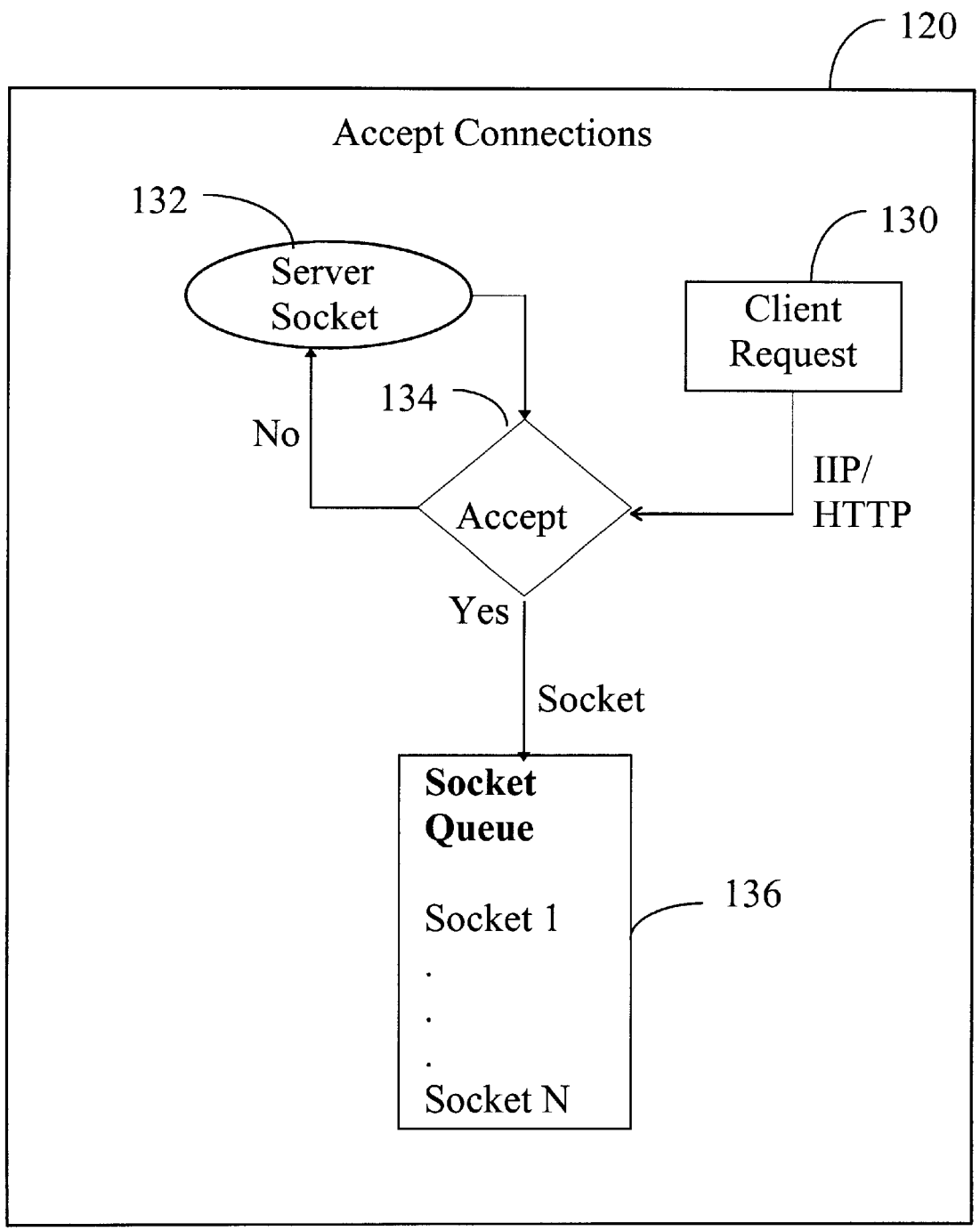
FIG. 7 is a simplified flowchart of a module within the server software of FIG. 6 for accepting client requests.
Figure 8:
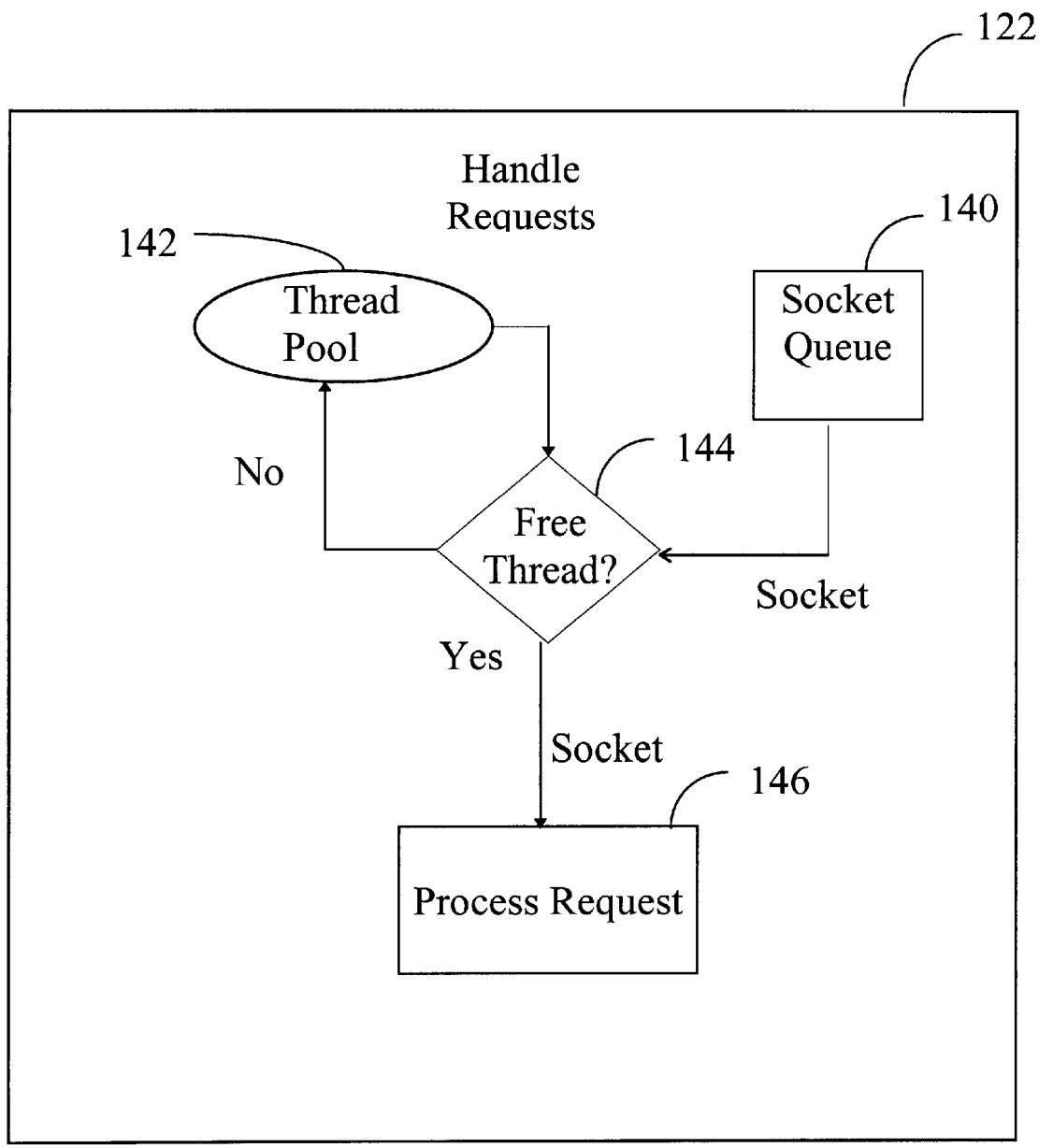
FIG. 8 is a simplified flowchart of a module within the server software of FIG. 6 for handling client requests.

As seen in FIGS. 6, 7 and 8, the socket is passed from the Accept Connections step 120 to a Handle Requests step 122.

The Handle Requests step 122 proceeds by reading incoming data sent by a client, parsing the information and processing the request. Since the above processing is likely to take more time than the time between client requests, assuming the existence of multiple clients, it is necessary for the Handle Requests step 122 to return control back to the Accept Connections step 120 which resumes waiting for new client connections. This is done by handing the socket to a separate thread for continued processing. The Handle Requests step 122 thus passes the socket to a thread pool 124.

Due to the nature of threads as described hereinabove, it is desirable to limit the number of concurrent threads while enabling fair handling of concurrent requests. Hence, a Manage Threads step 126 is constantly monitoring the active threads in the thread pool 124. Should an active thread be classified as a "slow thread", i.e. a thread which has exceeded the limit in processing time, the Manage Threads step 126 plays an active role. Otherwise, the Manage Threads step 126 passively watches the thread pool.

It may be appreciated that the criteria for classifying a thread as a "slow thread" need not necessarily be based on processing time. Alternatively or additionally it can be based on any suitable metric, such as a predetermined amount of disk access activity or a predetermined amount of memory allocation.

Reference is now made to FIG. 7, which details the Accept Connections 120 logic. A server socket 132 goes into a blocking Accept step 134, waiting for a client request 130 to arrive. Should a client request 130 not be forthcoming within a timeout limit, typically 2 seconds, the server socket 132 checks if an administrator requested that the server socket 132 exit. Otherwise, the server socket 132 returns to the Accept step 134.

If a client request 130 did occur while the server socket was in Accept step 134, a socket created by the Accept step 134 is passed to a socket queue 136. The socket queue 136 is employed to store client requests 130 pending their processing. As mentioned above, it is not efficient to automatically begin processing each request concurrently, i.e. to start a thread and process the request. Hence, each client request 130 is first placed into the socket queue 136 prior to processing.

Reference is now made to FIG. 8, which illustrates a process of handling requests by the Handle Request step 122, which is independent of the Accept Connection step 120. A thread pool 142 stores threads to be used for processing requests. This is more efficient than having each thread die at the end of its processing and restarting new threads, as there is a fixed overhead in creating threads which can be avoided.

The number of threads in the thread pool 142 is preferably proportional to the number of CPUs. A 1:1 relationship is currently recommended. This proportionality limits the inter-dependencies between threads, i.e. the sharing of the CPU resource. The thread pool 142 monitors the activity of the threads in the pool and asks the Free Thread? query 144. If there exists an inactive thread and the socket queue 140 has sockets waiting to be processed, a match is made and the socket is assigned to a thread. The matched thread is marked as active and processing begins in a Process Request step 146. Process Request step 146 includes various different stages mentioned in the Background hereinabove.

Figure 9:
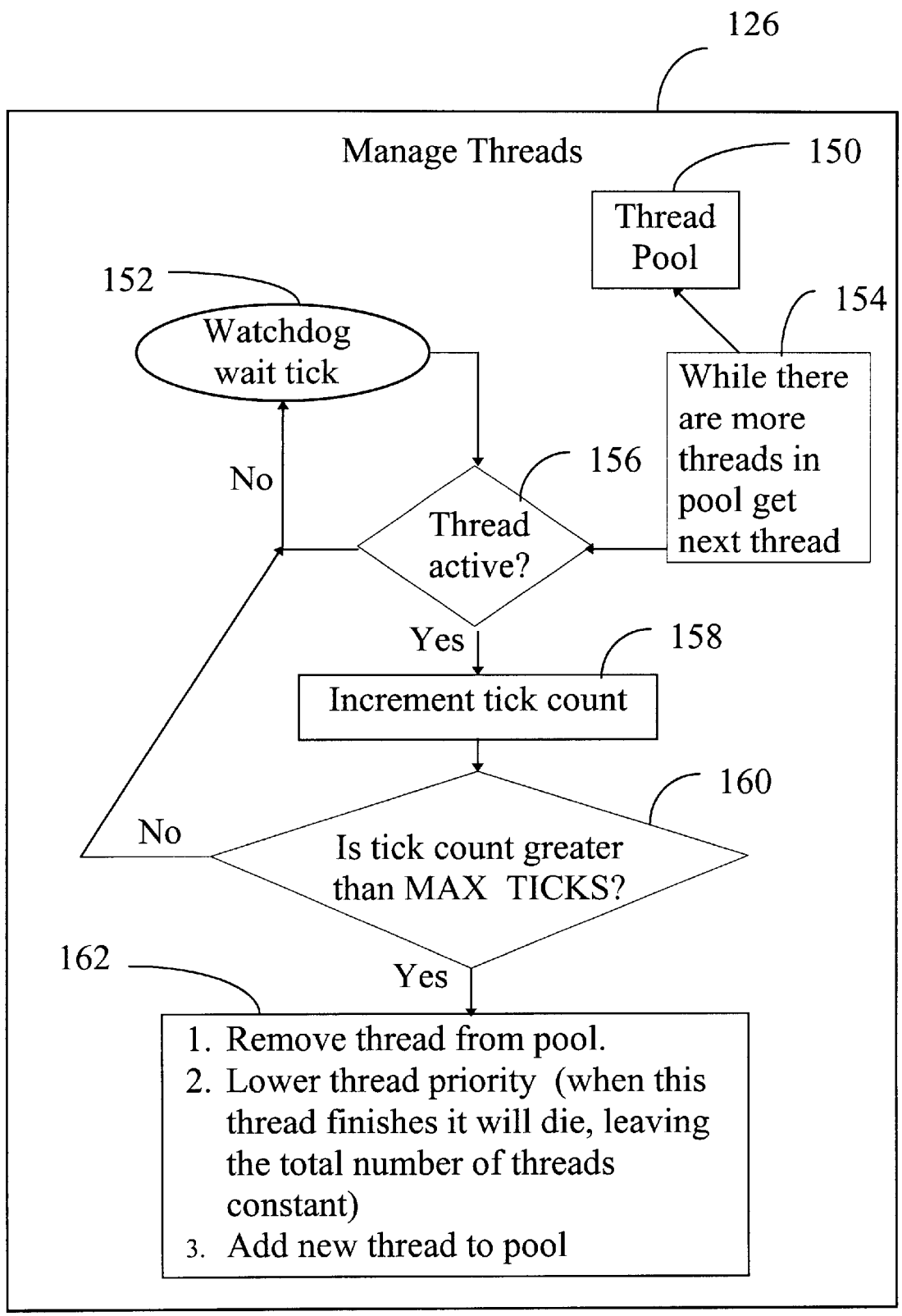
FIG. 9 is a simplified flowchart of a module within the server software of FIG. 6 for managing threads.

Reference is now made to FIG. 9, which describes the logic involved in the Manage Threads step 126. A watchdog 152 sleeps for 50 milliseconds, which corresponds to a single tick. This is believed to be more efficient than having the watchdog 152 continuously request the system time and compare it to the exact time a thread initiated processing, notwithstanding that the use of system time is more exact. At each tick the Thread Active? query 156 is asked of each thread 154 in the thread pool 150. Should no active threads be found, the watchdog 152 returns to a sleep state until the next tick.

When a thread in the thread pool 150 is determined to be active during a watchdog 152 tick by the Thread Active? query 156, then the tick count 158 in the active thread is incremented by one. Next an "Is tick count greater than MAX TICKS?" query 160 is asked. A MAX TICKS value is normally set to 3. Thus if a thread was busy processing for anywhere between 101 and 150 milliseconds, then that thread is labeled a "slow thread."

The labeling of a thread as a slow thread has three consequences enumerated in block 162. First the thread is removed from the thread pool 150, enabling it to die when it finishes processing. Second, the priority of the thread is lowered, reflecting an assumption that difficult requests should not interfere with simple requests in deference to fairness. Third, a new thread is created and placed in the thread pool 150 to replace the slow thread, thus ensuring the presence of a constant number of threads in the thread pool 150 to handle future client requests.

This mechanism ensures that a minimum of threads be used. Only when a request flags the fairness factor does a new thread get created. Furthermore, if requests get blocked attempting to use a shared resource, those threads have their priorities lowered. For example, if many concurrent simple requests are received, they might get blocked on the socket read/write.

Reference is now made to Appendix A, which is a listing of exemplary server-side software in the form of Java code, for implementing thread management in accordance with a preferred embodiment of the present invention.

The thread pool is defined in the RequestThreadPool.java object class. It includes m_concurrentThreads threads, stored in m_requestThreads [i], where i ranges from 0 to m_concurrentThreads−1.

The logic for monitoring these threads in the thread pool is performed in a separate thread, termed a "watchdog thread." Its behavior is defined in the WatchdogThread.java class, which provides function calls for determining when to initialize a new thread. In the try section of run ( ) there appear the following two lines of code:

sleep(m_watchdogTickDuration);
m_requestThreadPool.IncrementTicks( );

The first of these lines instructs the watchdog thread to sleep for a number of milliseconds determined by member m_watchdogTickDuration, which is an input parameter to the constructor, and is set to 50 in the RequestThreadPool( ) constructor.

The second of these lines invokes the method IncrementTicks( ) from the RequestThreadPool.java class. In turn, this method invokes the method IncrementTicks( ) from the RequestThread.java class, which increments the member m_watchdogTicks, for each of the m_concurrentThreads threads in the thread pool. If m_watchdogTicks exceeds m_spawnTheadAfterTicks, which is set to 3 in the RequestThreadPool( ) constructor, then the following two lines of code are executed in IncrementTicks ( ):

requestThread.SetSlowThread( );
m_requestThreads[i]=
  new RequestThread(this, "RequestThread"+i);

The method SetSlowThread( ) lowers the priority of the thread by 1, and indicates that this thread is no longer in the thread pool by setting m_isSlowThread to true. A new thread is stored in m_requestThreads[i] to replace the one that was removed, thereby keeping the total number of threads in the thread pool constant. The slow thread dies when it finishes handling a request.

Slow threads die when they complete processing of the request they are handling. In general, any thread dies when it finishes carrying out the instructions in its main run ( ) function, and exits run ( ). In the implementation shown in Appendix A, threads in the thread pool are prevented from exiting run ( ) by keeping them in a wait state. Slow threads, however, are allowed to exit when they finish processing their request, and this causes them to die.

Specifically, reference is made to the run ( ) function in RequestThread.java, where the Boolean variable ok is used to keep the thread alive. If ok is true, then the try section of code keeps the thread in a wait state when the socket queue is empty. This also prevents the thread to exit run ( ). If the queue is not empty, then a socket element is popped out of the queue and assigned to the thread. The thread then gets an HTTP request to process. However, for a slow thread, ok is set to false, thereby keeping it out of the try section of code and allowing it to exit run ( ). Exiting run ( ) automatically destroys the thread.

The PortThread.java class is used to assign server socket ports using a recycled pool of socket connections. Reference is made to the methods SocketQueuePush(i_socketElement) and SocketQueuePop( ), respectively, which show that the recycling is performed by stack "push" and "pop" methods.

It will be appreciated by persons skilled in the art that the present invention is not limited by what has been particularly shown and described hereinabove. Rather the present invention includes combinations and sub-combinations of the various features described hereinabove as well .as modifications and extensions thereof which would occur to a person skilled in the art and which do not fall within the prior art.

What is claimed is:

1. A computer thread management system comprising:
   at least one processor;
   a thread pool containing a plurality of threads for processing client requests, the threads in said thread pool being characterized in that they enter a wait state upon completion of a client request, and are not destroyed; and
   thread management software operating a plurality of threads including said thread pool, and operating said at least one processor by causing it to process requests using at least one thread, said thread management software being characterized in that it creates a new thread within said thread pool when an existing thread in said thread pool has exceeded a predetermined non-zero amount of busyness, irrespective of whether or not a client request is waiting in an incoming request queue for processing.

2. A computer thread management system according to claim 1 and wherein said thread management software creates a new thread within said thread pool only when an existing thread in said thread pool has exceeded said predetermined non-zero amount of busyness.

3. A computer thread management system according to claim 1 and wherein said thread management software is operative to open a socket connection for each new incoming request accepted by a thread for processing.

4. A computer thread management system according to claim 1 and wherein each existing thread can be in an active state or in a wait state.

5. A computer thread management system according to claim 1 and wherein said thread management software is operative to remove said existing thread from said thread pool when said existing thread has exceeded said predetermined non-zero amount of busyness, and wherein threads not contained within said thread pool are characterized in that they are destroyed upon completion of a client request.

6. A computer thread management system according to claim 1 and wherein each thread has an associated priority.

7. A computer thread management system according to claim 6 and wherein said thread management software lowers the priority of said existing thread when said existing thread has exceeded said predetermined non-zero amount of busyness.

8. A computer thread management system according to claim 1 and wherein said predetermined non-zero amount of busyness is a predetermined time duration measured during activity of a thread.

9. A computer thread management system according to claim 8 and wherein said predetermined time duration is determined by incrementing ticks for each thread which is in an active state following initiation of its activity and at fixed time intervals.

10. A computer thread management system according to claim 8 and wherein said predetermined time duration is determined by incrementing ticks for each thread which is in an active state following initiation of its activity at fixed time intervals which are not measured from the onset of its activity.

11. A computer thread management system according to claim 10 and wherein said fixed time intervals are 50 msecs, and said predetermined time duration is the time expended until three ticks have been incremented.

12. A computer thread management system according to claim 1 and wherein said predetermined non-zero amount of busyness is a predetermined amount of disk access activity.

13. A computer thread management system according to claim 1 and wherein said predetermined non-zero amount of busyness is a predetermined amount of memory allocation.

14. A computer thread management method comprising:
  operating at least one processor and a thread pool containing a plurality of threads for processing client requests, the threads in said thread pool being characterized in that they enter a wait state upon completion of a client request, and are not destroyed, including:
    utilizing thread management software operating a plurality of threads including said thread pool, and operating at least one processor by causing it to process requests using at least one thread, said thread management software being characterized in that it creates a new thread within said thread pool when an existing thread in said thread pool has exceeded a predetermined non-zero amount of busyness, irrespective of whether or not a client request is waiting in an incoming request queue for processing.

15. A method according to claim 14 and wherein said thread management software creates a new thread within said thread pool only when an existing thread in said thread pool has exceeded said predetermined non-zero amount of busyness.

16. A method according to claim 14 and wherein said thread management software opens a socket connection for each new incoming request accepted by a thread for processing.

17. A method according to claim 14 and wherein each existing thread can be in an active state or in a wait state.

18. A method according to claim 14 and wherein said thread management software removes said existing thread from said thread pool when said existing thread has exceeded said predetermined non-zero amount of busyness, and wherein threads not contained within said thread pool are characterized in that they are destroyed upon completion of a client request.

19. A method according to claim 14 and wherein each thread has an associated priority.

20. A method according to claim 19 and wherein said thread management software lowers the priority of said existing thread when said existing thread has exceeded said predetermined non-zero amount of busyness.

21. A method according to claim 14 and wherein said predetermined non-zero amount of busyness is a predetermined time duration measured during activity of a thread.

22. A method according to claim 21 and wherein said predetermined time duration is determined by incrementing ticks for each thread which is in an active state following initiation of its activity and at fixed time intervals.

23. A method according to claim 21 and wherein said predetermined time duration is determined by incrementing ticks for each thread which is in an active state following initiation of its activity at fixed time intervals which are not measured from the onset of its activity.

24. A method according to claim 23 and wherein said fixed time intervals are 50 msecs, and said predetermined time duration is the time expended until three ticks have been incremented.

25. A method according to claim 14 and wherein said predetermined non-zero amount of busyness is a predetermined amount of disk access activity.

26. A method according to claim 14 and wherein said predetermined non-zero amount of busyness is a predetermined amount of memory allocation.

27. A computer thread management system for processing multiple requests by using at least one of a plurality of processing threads comprising:
  thread monitoring software monitoring said plurality of processing threads; and
  thread management software creating new threads, preserving some processing threads after processing requests by putting them into a wait state, lowering priorities of threads, and allowing some threads to be destroyed after processing requests, based upon output from said thread monitoring software.

28. A computer thread management system according to claim 27 and wherein said output from said thread monitoring software is a measure of thread busyness.

29. A computer thread management method for processing multiple requests using at least one of a plurality of processing threads comprising:
  monitoring said plurality of processing threads;
  creating new threads based upon output from said monitoring;
  preserving some processing threads after processing requests by putting them into a wait state, based upon output from said monitoring;
  lowering priorities of threads based upon output from said monitoring; and
  allowing some threads to be destroyed after processing requests based upon output from said monitoring.

30. A method according to claim 29 and wherein said output from said monitoring step is a measure of thread busyness.

* * * * *